United States Patent
Chiba

(10) Patent No.: US 12,363,144 B2
(45) Date of Patent: Jul. 15, 2025

(54) INFORMATION PROCESSING SYSTEM, INFORMATION PROCESSING METHOD, AND PROGRAM FOR DETECTING MALICIOUS IN-VEHICLE NETWORK ATTACK VECTORS

(71) Applicant: NTT Security (Japan) KK, Tokyo (JP)

(72) Inventor: Yasunobu Chiba, Tokyo (JP)

(73) Assignee: NTT Security (Japan) KK, Tokyo (JP)

( * ) Notice: Subject to any disclaimer, the term of this patent is extended or adjusted under 35 U.S.C. 154(b) by 198 days.

(21) Appl. No.: 18/362,247

(22) Filed: Jul. 31, 2023

(65) Prior Publication Data

US 2023/0379344 A1 Nov. 23, 2023

Related U.S. Application Data

(63) Continuation of application No. PCT/JP2022/006735, filed on Feb. 18, 2022.

(30) Foreign Application Priority Data

Feb. 26, 2021 (JP) .................................. 2021-030478

(51) Int. Cl.
*H04L 9/40* (2022.01)
*H04L 41/12* (2022.01)

(52) U.S. Cl.
CPC .......... *H04L 63/1416* (2013.01); *H04L 41/12* (2013.01); *H04L 63/1425* (2013.01)

(58) Field of Classification Search
CPC . H04L 63/1416; H04L 63/1425; H04L 67/12; H04L 2012/40215; G06F 21/55
See application file for complete search history.

(56) References Cited

U.S. PATENT DOCUMENTS

| | | | |
|---|---|---|---|
| 2019/0044912 A1* | 2/2019 | Yang | G06F 21/50 |
| 2019/0306180 A1* | 10/2019 | Dyakin | G06F 21/566 |
| 2021/0344700 A1 | 11/2021 | Ueno et al. | |
| 2021/0377289 A1* | 12/2021 | Okano | H04L 63/1425 |
| 2023/0283617 A1* | 9/2023 | Tasaki | G06F 21/55 726/22 |

FOREIGN PATENT DOCUMENTS

| | | | | |
|---|---|---|---|---|
| EP | 3393086 | | 10/2018 | |
| EP | 3490223 | | 5/2019 | |
| EP | 3490223 | A1 * | 5/2019 | ............. H04L 67/12 |
| JP | 2010-152773 | | 7/2010 | |
| JP | 2019-050477 | | 3/2019 | |
| JP | 2020-119090 | | 8/2020 | |
| WO | 2020/075808 | | 4/2020 | |

OTHER PUBLICATIONS

International Search Report for PCT/JP2022/006735 mailed on May 10, 2022.

Extended European Search Report issued in European Application No. 22759531.1, mailed Nov. 20, 2024.

* cited by examiner

*Primary Examiner* — Hee Soo Kim
(74) *Attorney, Agent, or Firm* — IPUSA, PLLC

(57) ABSTRACT

An information processing system is configured to acquire log data of a system including a network and a plurality of constituent elements that communicate via the network, and output information of one or more attack vectors including information of constituent elements related to the one or more attack vectors, based on the log data and network configuration information of the system in a case where an attack is detected in the system.

11 Claims, 26 Drawing Sheets

| Vehicle Identification Number | NODE X | NODE Y |
|---|---|---|
| JP000000000000001 | TCU | CGW |
| JP000000000000001 | CGW | IVI |
| JP000000000000001 | CGW | ENGINE |
| JP000000000000002 | TCU | CGW |
| JP000000000000002 | CGW | IVI |
| JP000000000000002 | CGW | ENGINE |
| ... | ... | ... |
| JP000000000001999 | TCU | CGW |
| JP000000000001999 | IVI | CGW |
| JP000000000001999 | TCU | IVI |
| JP000000000001999 | CGW | ENGINE |

FIG.7A

| Vehicle Identification Number | ECU | Ethernet (registered trademark) Interface | Ethernet Segment |
|---|---|---|---|
| JP00000000000001 | TCU | eth0 | Ethernet-0 |
| JP00000000000001 | CGW | eth0 | Ethernet-0 |
| JP00000000000002 | TCU | eth0 | Ethernet-0 |
| JP00000000000002 | CGW | eth0 | Ethernet-0 |
| ... | ... | ... | ... |
| JP00000000001999 | TCU | eth0 | Ethernet-0 |
| JP00000000001999 | IVI | eth0 | Ethernet-0 |
| JP00000000001999 | CGW | eth0 | Ethernet-0 |

| Vehicle Identification Number | ECU | CAN (registered trademark) Interface | CAN Bus |
|---|---|---|---|
| JP00000000000001 | CGW | can0 | CAN-0 |
| JP00000000000001 | CGW | can1 | CAN-1 |
| JP00000000000001 | IVI | can0 | CAN-0 |
| JP00000000000001 | ENGINE | can0 | CAN-1 |
| JP00000000000002 | CGW | can0 | CAN-0 |
| JP00000000000002 | CGW | can1 | CAN-1 |
| JP00000000000002 | IVI | can0 | CAN-0 |
| JP00000000000002 | ENGINE | can0 | CAN-1 |
| ... | ... | ... | ... |
| JP00000000001999 | CGW | can0 | CAN-0 |
| JP00000000001999 | ENGINE | can0 | CAN-0 |

| Vehicle Identification Number | Ethernet Segment | Application Identifier | Application |
|---|---|---|---|
| JP0000000000000001 | Ethernet-0 | 0x123 | Traffic Jam Information Notification |
| JP0000000000000001 | Ethernet-0 | 0x124 | Map Information Notification |
| JP0000000000000002 | Ethernet-0 | 0x123 | Traffic Jam Information Notification |
| JP0000000000000002 | Ethernet-0 | 0x124 | Map Information Notification |
| ... | ... | ... | ... |
| JP0000000000001999 | Ethernet-0 | 0x100 | Rotation Speed Notification |
| JP0000000000001999 | Ethernet-0 | 0x101 | Traffic Jam Information Notification |
| JP0000000000001999 | Ethernet-0 | 0x103 | Map Information Notification |

| Vehicle Identification Number | CAN Bus | CAN ID | Application |
|---|---|---|---|
| JP0000000000000001 | CAN-0 | 0x192 | Rotation Speed Notification |
| JP0000000000000001 | CAN-0 | 0x2e8 | Traffic Jam Information Notification |
| JP0000000000000001 | CAN-0 | 0x2f1 | Map Information Notification |
| JP0000000000000001 | CAN-1 | 0x192 | Rotation Speed Notification |
| JP0000000000000002 | CAN-0 | 0x192 | Rotation Speed Notification |
| JP0000000000000002 | CAN-0 | 0x2e8 | Traffic Jam Information Notification |
| JP0000000000000002 | CAN-0 | 0x2f1 | Map Information Notification |
| JP0000000000000002 | CAN-1 | 0x192 | Rotation Speed Notification |
| ... | ... | ... | ... |
| JP0000000000001999 | CAN-0 | 0x128 | Rotation Speed Notification |

FIG.9A 414-1

| Vehicle Identification Number | MAC Address | ECU |
|---|---|---|
| JP000000000000001 | 02:00:00:00:01:01 | TCU |
| JP000000000000001 | 02:00:00:00:01:02 | CGW |
| JP000000000000002 | 02:00:00:00:02:01 | TCU |
| JP000000000000002 | 02:00:00:00:02:02 | CGW |
| ... | ... | ... |
| JP000000000001999 | 02:00:00:07:CF:01 | TCU |
| JP000000000001999 | 02:00:00:07:CF:02 | IVI |
| JP000000000001999 | 02:00:00:07:CF:03 | CGW |

FIG.9B 414-2

| Vehicle Identification Number | IP Address | ECU |
|---|---|---|
| JP000000000000001 | 192.168.0.1 | TCU |
| JP000000000000001 | 192.168.0.2 | CGW |
| JP000000000000002 | 192.168.0.1 | TCU |
| JP000000000000002 | 192.168.0.2 | CGW |
| ... | ... | ... |
| JP000000000001999 | 172.16.0.1 | TCU |
| JP000000000001999 | 172.16.0.2 | IVI |
| JP000000000001999 | 172.16.0.3 | CGW |

FIG.10A

| Vehicle Identification Number | CAN Bus | CAN ID | Reception ECU |
|---|---|---|---|
| JP00000000000000001 | CAN-0 | 0x192 | IVI |
| JP00000000000000001 | CAN-0 | 0x2e8 | IVI |
| JP00000000000000001 | CAN-0 | 0x2f1 | IVI |
| JP00000000000000001 | CAN-1 | 0x192 | CGW |
| JP00000000000000002 | CAN-0 | 0x192 | IVI |
| JP00000000000000002 | CAN-0 | 0x2e8 | IVI |
| JP00000000000000002 | CAN-1 | 0x2f1 | IVI |
| ... | ... | 0x192 | CGW |
| JP00000000000001999 | CAN-0 | 0x128 | CGW |

| Vehicle Identification Number | Source IP Address | Destination IP Address | IP Protocol | Source Port Number | Destination Port Number |
|---|---|---|---|---|---|
| JP0000000000000001 | 192.168.0.1 | 192.168.0.2 | UDP | Any | 31000 |
| JP0000000000000001 | 192.168.0.1 | 192.168.0.2 | UDP | Any | 31001 |
| JP0000000000000002 | 192.168.0.1 | 192.168.0.2 | UDP | Any | 31000 |
| JP0000000000000002 | 192.168.0.1 | 192.168.0.2 | UDP | Any | 31001 |
| ... | ... | ... | ... | ... | ... |
| JP0000000000001999 | 172.16.0.1 | 172.16.0.2 | UDP | Any | 31000 |
| JP0000000000001999 | 172.16.0.2 | 172.16.0.1 | TCP | 1024-65535 | 443 |
| JP0000000000001999 | 172.16.0.2 | 172.16.0.1 | TCP | 443 | 1024-65535 |
| JP0000000000001999 | 172.16.0.3 | 172.16.0.2 | UDP | Any | 31001 |

FIG.11

| Detection Date and Time | Vehicle identification Number | Sensor Name | ECU Name | Input Interface Name | Output Interface Name | Source MAC Address | Destination MAC Address | Application Identifier | CAN ID | Detection Event |
|---|---|---|---|---|---|---|---|---|---|---|
| 2020/1/30 6:28 | JP000000 000000001 | Ethernet IDS | CGW | eth0 | N/A | 02:00:00:00:01:01 | 02:00:00:00:01:02 | 0x123 | N/A | Abnormal Value |
| 2020/1/30 6:28 | JP000000 000000001 | CAN IDS | CGW | N/A | can0 | N/A | N/A | N/A | 0x2e8 | Abnormal Timing |
| 2020/1/30 6:28 | JP000000 000000002 | CAN IDS | CGW | N/A | can0 | N/A | N/A | N/A | 0x2e8 | Abnormal Value |
| 2020/1/30 6:20 | JP000000 000000001 | Privilege Operation Monitoring | TCU | N/A | N/A | N/A | N/A | N/A | N/A | Privileged Operation Execution |
| 2020/1/30 6:20 | JP000000 000000001 | Process Monitoring | TCU | N/A | N/A | N/A | N/A | N/A | N/A | Start Process |
| 2020/1/30 6:20 | JP000000 000000001 | Process Monitoring | TCU | N/A | N/A | N/A | N/A | N/A | N/A | Stop Process |
| 2020/1/29 23:03 | JP000000 000000001 | Process Monitoring | TCU | N/A | N/A | N/A | N/A | N/A | N/A | Start Process |
| ... | ... | ... | ... | ... | ... | ... | ... | ... | ... | ... |

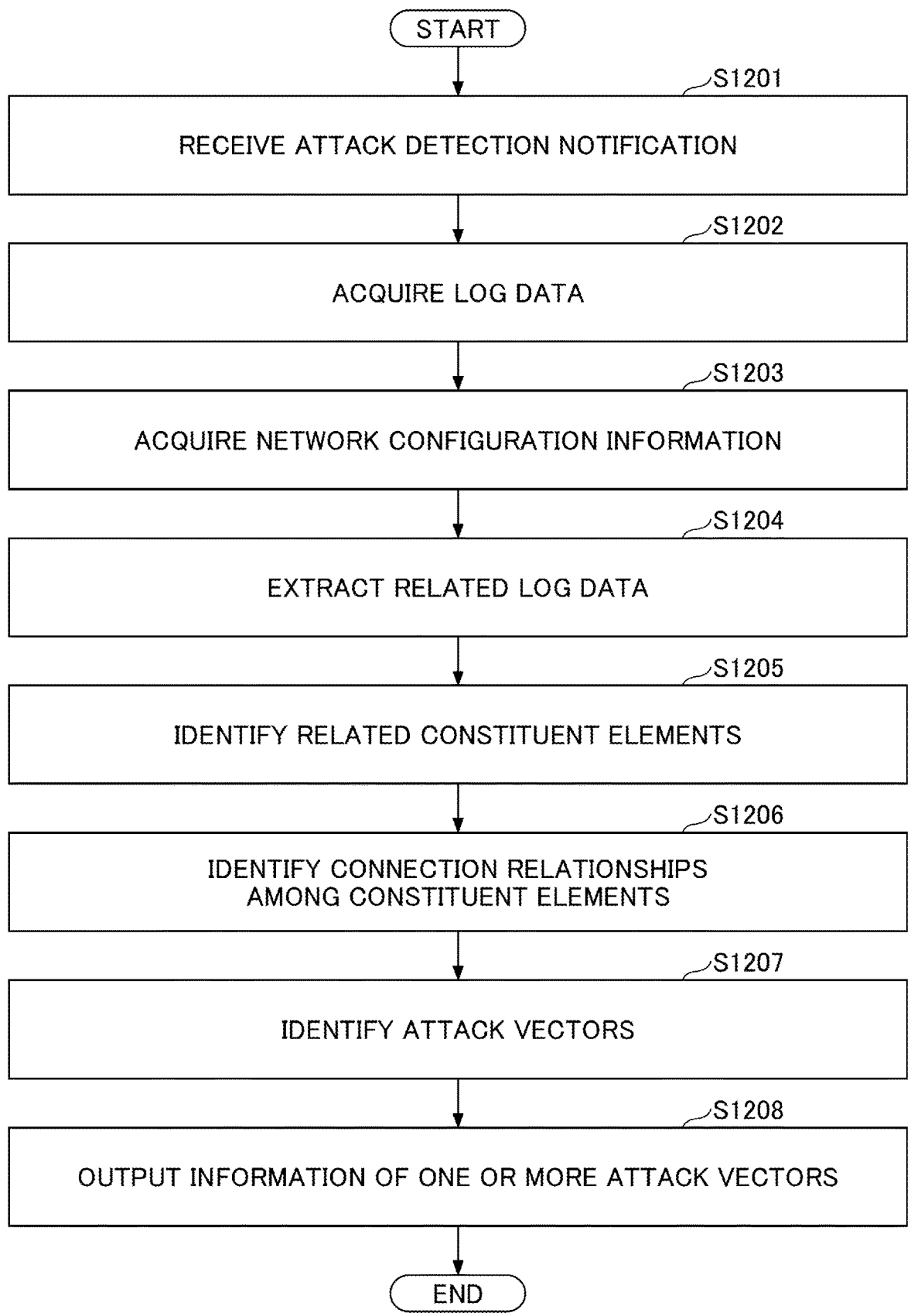

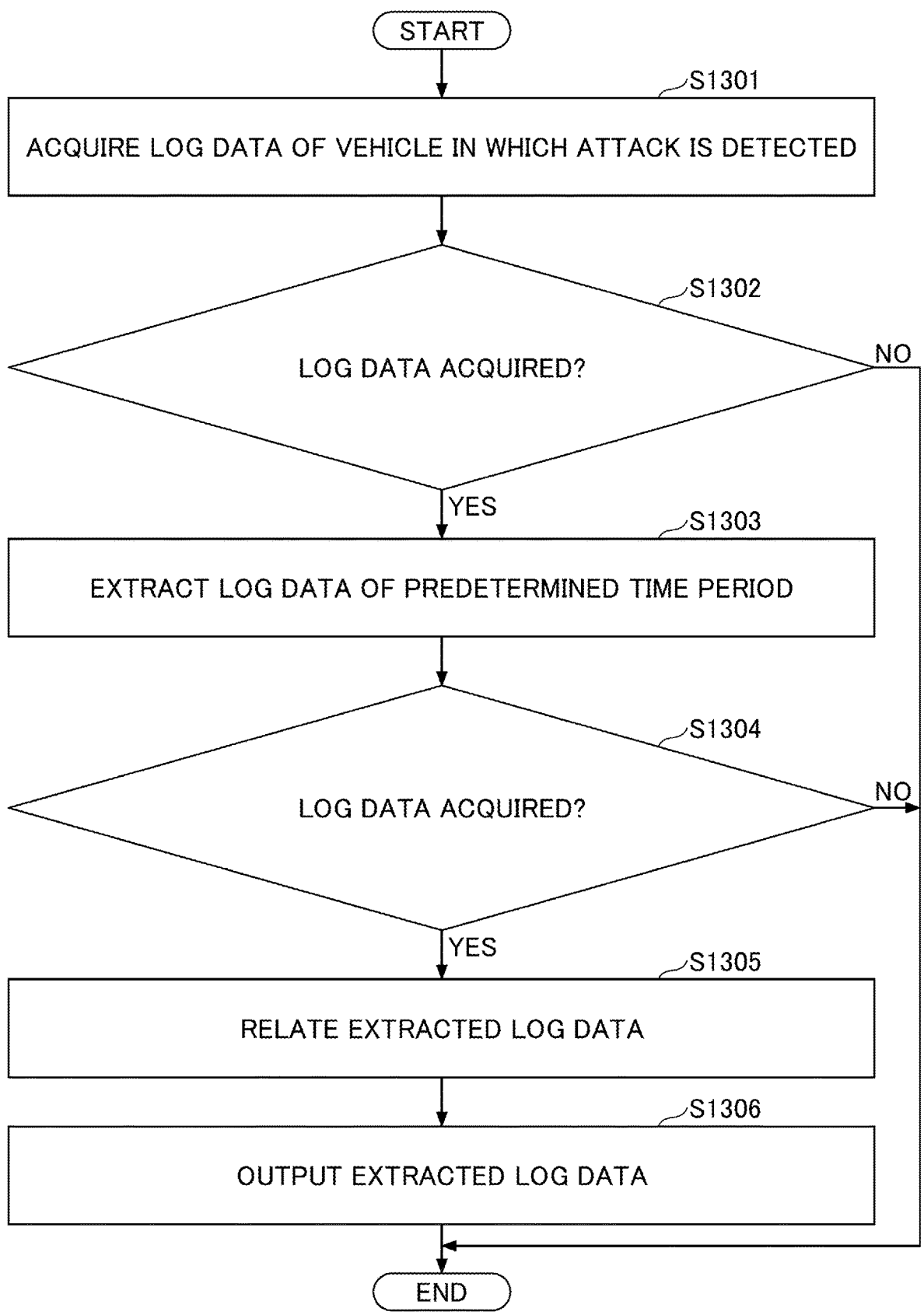

FIG.14A

| | | |
|---|---|---|
| Detection Date and Time | 2020-01-30 06:28:30 | 1401 |
| Vehicle Identification Number | JP000000000000001 | |
| Sensor Name | Ethernet IDS | |
| ECU Name | CGW | |
| Input Interface Name | eth0 | |
| Source MAC Address | 02:00:00:00:01:01 | |
| Destination MAC Address | 02:00:00:00:01:02 | |
| Application Identifier | 0x123 | |
| Detection Date and Time | 2020-01-30 06:28:29 | 1402 |
| Vehicle Identification Number | JP000000000000001 | |
| Sensor Name | CAN IDS | |
| ECU Name | CGW | |
| Output Interface Name | can0 | |
| CAN ID | 0x2e8 | |
| Detection Date and Time | 2020-01-30 06:28:28 | 1403 |
| Vehicle Identification Number | JP000000000000002 | |
| Sensor Name | CAN IDS | |
| ECU Name | CGW | |
| Output Interface Name | can0 | |
| CAN ID | 0x2e8 | |
| Detection Date and Time | 2020-01-30 06:20:52 | 1404 |
| Vehicle Identification Number | JP000000000000001 | |
| Sensor Name | Process Monitoring | |
| ECU Name | TCU | |
| Detection Date and Time | 2020-01-30 06:20:51 | 1405 |
| Vehicle Identification Number | JP000000000000001 | |
| Sensor Name | Process Monitoring | |
| ECU Name | TCU | |
| Detection Date and Time | 2020-01-29 23:03:01 | 1406 |
| Vehicle Identification Number | JP000000000000001 | |
| Sensor Name | Process Monitoring | |
| ECU Name | TCU | |

FIG.14B

| Detection Date and Time | 2020-01-30 06:28:30 |
|---|---|
| Vehicle Identification Number | JP000000000000001 |
| Sensor Name | Ethernet IDS |
| ECU Name | CGW |
| Input Interface Name | eth0 |
| Source MAC Address | 02:00:00:00:01:01 |
| Destination MAC Address | 02:00:00:00:01:02 |
| Application Identifier | 0x123 |

⟵ 1401

| Detection Date and Time | 2020-01-30 06:28:29 |
|---|---|
| Vehicle Identification Number | JP000000000000001 |
| Sensor Name | CAN IDS |
| ECU Name | CGW |
| Output Interface Name | can0 |
| CAN ID | 0x2e8 |

⟵ 1402

| Detection Date and Time | 2020-01-30 06:20:52 |
|---|---|
| Vehicle Identification Number | JP000000000000001 |
| Sensor Name | Process Monitoring |
| ECU Name | TCU |

⟵ 1404

| Detection Date and Time | 2020-01-30 06:20:51 |
|---|---|
| Vehicle Identification Number | JP000000000000001 |
| Sensor Name | Process Monitoring |
| ECU Name | TCU |

⟵ 1405

| Detection Date and Time | 2020-01-29 23:03:01 |
|---|---|
| Vehicle Identification Number | JP000000000000001 |
| Sensor Name | Process Monitoring |
| ECU Name | TCU |

⟵ 1406

INFORMATION PROCESSING SYSTEM, INFORMATION PROCESSING METHOD, AND PROGRAM FOR DETECTING MALICIOUS IN-VEHICLE NETWORK ATTACK VECTORS

CROSS-REFERENCE TO RELATED APPLICATIONS

This application is a continuation application of International Application No. PCT/JP2022/006735 filed on Feb. 18, 2022 and designated the U.S., which is based upon and claims priority to Japanese Patent Application No. 2021-030478, filed on Feb. 26, 2021, the entire contents of which are incorporated herein by reference.

TECHNICAL FIELD

The present disclosure relates to information processing systems, information processing methods, and programs.

BACKGROUND

There is a technology for implementing a Security Operation Center (SOC) for a vehicle, which detects an attack, such as a cyber attack or the like, by analyzing output data from a security sensor mounted on the vehicle, such as an automobile or the like, and identifies an area of influence or the like of the attack.

For example, there is known a system in which a SOC server detects an abnormal operation based on log data transmitted from an in-vehicle network, estimates the area of influence, a severity of danger, a type or cause of threat, or the like, and transmits a response instruction to the vehicle. Such a known system is proposed in Japanese Laid-Open Patent Publication No. 2020-119090, for example.

In order to take measures against the attack, such as the cyber attack or the like, it is desirable to identify constituent elements of a system which participated in or were involved in the attack including a plurality of stages for clarifying events that may occur due to the attack (which can be derived from features of the constituent elements). In particular, in the system, such as the vehicle having a large number of constituent elements, it is difficult to clarify a success factor of the attack or the events that may occur due to the attack, without identifying the constituent elements of the system which participated in or were involved in the attack.

Japanese Laid-Open Patent Publication No. 2020-119090 describes, among other things, estimating a device which is connected to the same bus as a device which generated the log data indicating an abnormal operation, as the area of influence affected by the abnormal operation, for example, however, it is difficult to estimate, solely from such an estimation, the device which participated in or was involved in the attack.

SUMMARY

An information processing system according to one aspect of the embodiments includes a storage configured to store a program; and a processor configured to execute the program and perform a process including acquiring log data of a system including a network and a plurality of constituent elements that communicate via the network, and outputting information of one or more attack vectors including information of constituent elements related to the one or more attack vectors, based on the log data and network configuration information of the system in a case where an attack is detected in the system.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF DRAWINGS

FIG. 7A is a diagram (3) illustrating the example of the network configuration information according to one embodiment.

FIG. 7B is a diagram (4) illustrating the example of the network configuration information according to one embodiment.

FIG. 8A is a diagram (5) illustrating the example of the network configuration information according to one embodiment.

FIG. 8B is a diagram (6) illustrating the example of the network configuration information according to one embodiment.

FIG. 9A is a diagram (7) illustrating the example of the network configuration information according to one embodiment.

FIG. 9B is a diagram (8) illustrating the example of the network configuration information according to one embodiment.

FIG. 10A is a diagram (9) illustrating the example of the network configuration information according to one embodiment.

FIG. 10B is a diagram (10) illustrating the example of the network configuration information according to one embodiment.

FIG. 11 is a diagram illustrating an example of log data according to one embodiment.

FIG. 12 is a flow chart illustrating an example of a process of the SOC server according to one embodiment.

FIG. 13 is a flow chart illustrating an example of a related log extraction process according to one embodiment.

FIG. 14A is a diagram (1) for explaining the related log extraction process according to one embodiment.

FIG. 14B is a diagram (2) for explaining the related log extraction process according to one embodiment.

DETAILED DESCRIPTION

One aspect of the embodiments disclosed herein facilitates estimation of constituent elements which participated in or were involved in an attack, when the attack is detected in a system including a network and a plurality of constituent elements which performs communication via the network.

Hereinafter, embodiments of the present invention will be described with reference to the drawings. The embodiments described in the following are merely examples, and the embodiments to which the present invention is applied is not limited to the following embodiments.

<Overall Configuration>

Figure 1:
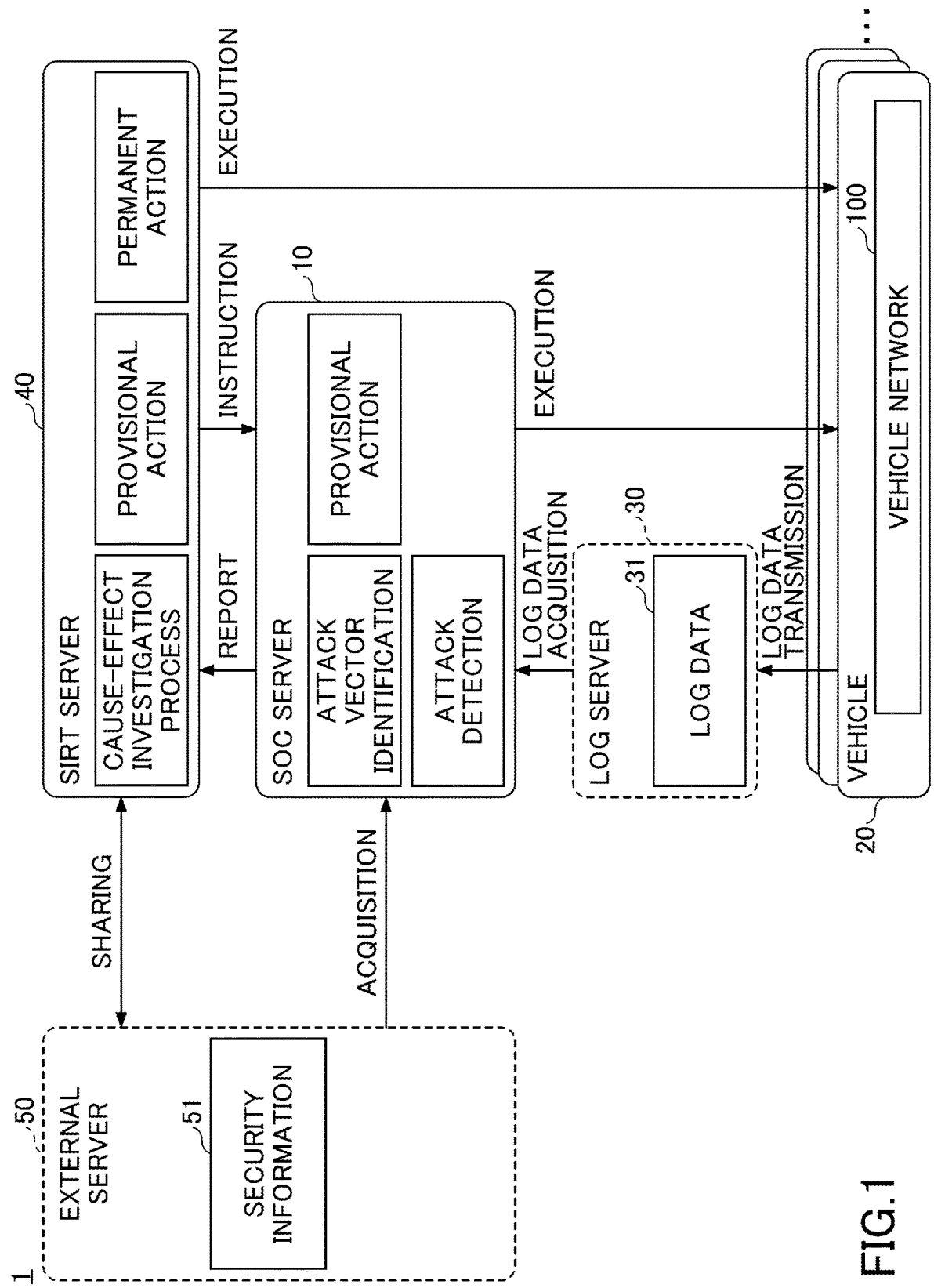
FIG. 1 is a diagram illustrating an example of an overall configuration of an information processing system according to one embodiment.

FIG. 1 is a diagram illustrating an example of an overall configuration of an information processing system according to one embodiment. An information processing system 1 includes, among other things, a Security Operation Center (SOC) server 10 and a Security Incident Response Team (SIRT) server 40 which are communicable with each other via a communication network, for example.

The SOC server 10 is a system including an information processing apparatus having a configuration of a computer, or a system including a plurality of information processing apparatuses. The SOC server 10 acquires log data of an in-vehicle network 100 transmitted by a vehicle 20, such as an automobile or the like, for example, and uses the acquired log data to perform a security monitoring for the vehicle, such as detecting a cyber attack on the vehicle 20, identifying an attack vector, or the like. For example, when the SOC server 10 detects the cyber attack (hereinafter simply referred to as an "attack") on the vehicle 20, the SOC server 10 transmits a report, that includes information indicating the detection of the attack and information of one or more attack vectors, to the SIRT server 40 or the like.

The attack vectors represent constituent elements of the in-vehicle network 100, connection relationships among the constituent elements, progressing directions of the attacks, or the like, that are related to the detected attack vectors. Preferably, the attack vector represents the progress of the attack by a directed graph in which the constituent elements connected to the in-vehicle network 100 are represented as nodes, and communication paths are represented as links. However, the attack vector is not limited to this representation, and can be represented by an undirected graph that does not include a direction, or can be a list of constituent elements which participated in or were involved in the attack.

The SOC server 10 acquires log data 31 transmitted by one or more vehicles 20, from a log server 30 or the like which collects the log data 31 from the one or more vehicles 20. However, the present invention is not limited to this arrangement, and the SOC server 10 can acquire the log data 31 transmitted by the one or more vehicles 20 from the one or more vehicles 20 via a mobile communication network. For example, functions of the log server 30 can be included in the SOC server 10.

In addition, the SOC server 10 can acquire security information 51 from an external server 50 operated by an Automotive Information Sharing and Analysis Center (Auto-ISAC) or the like, for example, via a communication network such as the Internet. The security information 51 includes various cyber security information, such as connected car-related cyber threats, potential vulnerabilities, or the like, for example.

The SOC server 10 can detect the attack on the vehicle 20 based on the acquired log data 31 and the security information 51, or can detect the attack on the vehicle 20 based on an attack detection notification or the like notified from the vehicle 20, the log server 30, or the like.

Moreover, the SOC server 10 can have a function of taking a provisional action on the vehicle 20 when the attack on the vehicle 20 is detected, based on the acquired security information 51, an instruction from the SIRT server 40, or the like.

The SIRT server 40 is a system including an information processing apparatus having a configuration of a computer, or a system including a plurality of information processing apparatuses. The SIRT server 40 is a server operated by an organization (SIRT) which takes security measures against an external threat that threatens a safety of a product, in order to ensure the safety of the product manufactured and sold by a vehicle manufacturer, an in-vehicle device manufacturer, or the like, for example. The SIRT may also be referred to as a Product Security Incident Response Team (PSIRT).

The SIRT server 40 has a function of taking a permanent action including a policy for response with respect to the vehicle 20, in a case where the policy for response or the like determined for each manufacturer based on a report on security transmitted by the SOC server 10 is input to the SIRT server 40, for example. In addition, the SIRT server 40 can have a function of sharing the security information 51 with the external server 50, and instructing the SOC server 10 or the vehicle 20 to take the provisional action with respect to the vehicle 20 based on the security information 51.

(Example of In-Vehicle Network)

Figure 2:
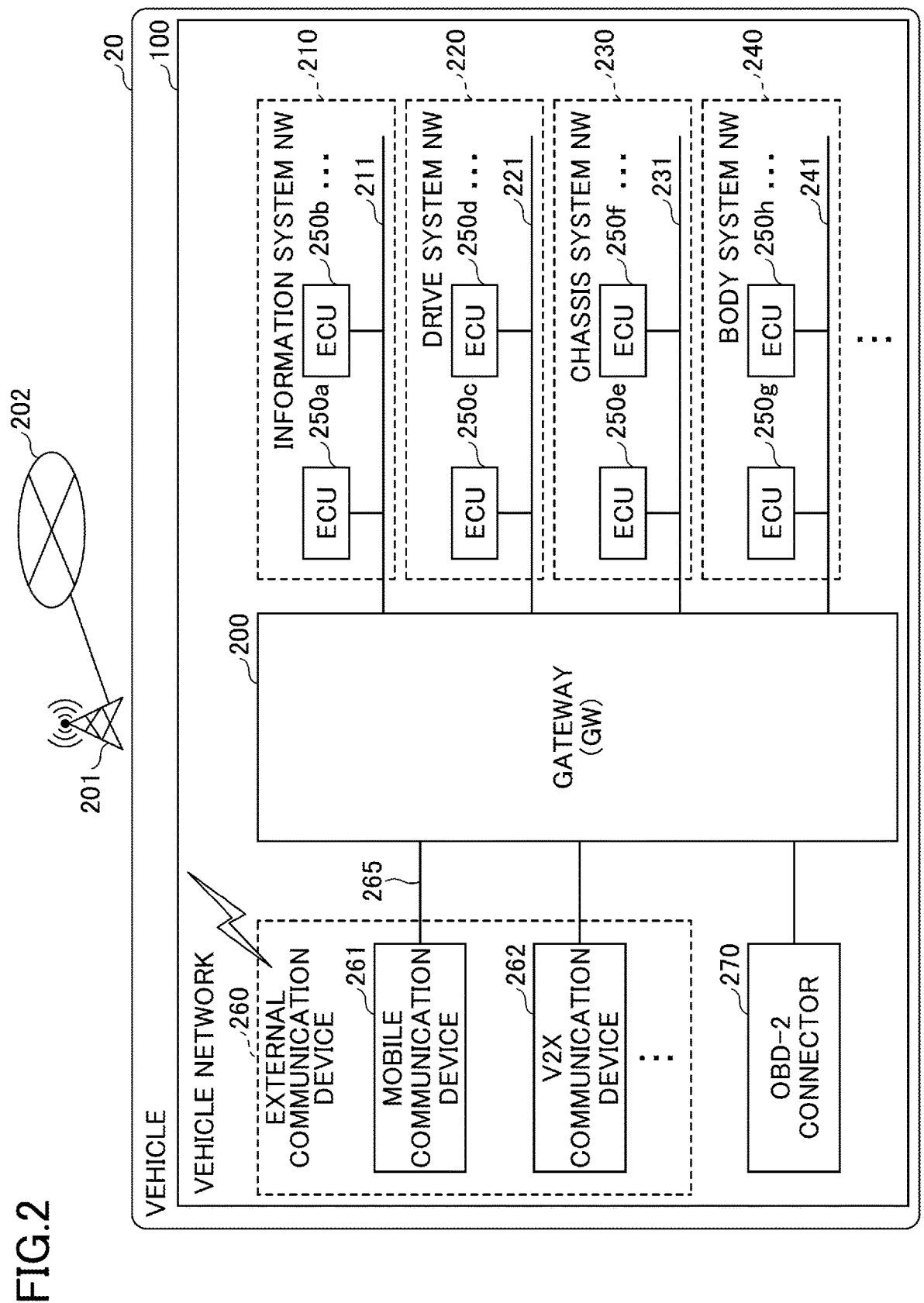
FIG. 2 is a diagram illustrating an example of a configuration of an in-vehicle network according to one embodiment.

FIG. 2 illustrates an example of the in-vehicle network according to one embodiment. Because the configuration of the in-vehicle network 100 implemented in the vehicle 20 varies depending on the vehicle manufacturer, the configuration of the in-vehicle network 100 illustrated in FIG. 2 is merely an example.

In the example of FIG. 2, the in-vehicle network 100 includes a plurality of networks, such as an information system network (NW) 210, a drive system NW 220, a chassis system NW 230, a body system NW 240, . . . , or the like, an external communication device 260, a ODB-2 connector 270, a gateway 200, or the like.

The information system NW 210 includes one or more Electronic Control Units (ECUs) connected to a bus (communication path) 211, such as the Ethernet (registered trademark), a Control Area Network (CAN) (registered trademark), a Media Oriented Systems transport (MOST) (registered trademark), or the like, for example. The ECU is an electronic controller for implementing a predetermined control function by executing a predetermined program. ECUs 201a and 201b connected to the information system NW 210 include in-vehicle devices for In-Vehicle Infotainment (IVI) or the like that provide information and entertainment in the vehicle 20, for example. The IVI includes communication functions using a Universal Serial Bus (USB), Bluetooth (registered trademark), a wireless Local Area Network (LAN), or the like, for example, in addition to functions such as car navigation, audio, video player, vehicle setting, or the like.

The drive system NW 220 includes one or more ECUs 250c, ECU 250d, or the like connected to a bus (communication path) 221, such as a CAN or FlexRay (registered trademark), for example. Sensors, actuators, or the like are connected to the ECUs 250c and 250d connected to the drive system NW 220, for example, and an engine, a brake, a motor, or the like is controlled by executing a predetermined program.

The chassis system NW 230 includes one or more ECUs 250e, 250f, or the like connected to a bus (communication path) 231, such as a CAN or FlexRay, for example. Sensors, actuators, or the like are connected to the ECUs 250e and 250f connected to the chassis system NW 230, for example, and a steering, a suspension, or the like is controlled by executing a predetermined program.

The body system NW 240 includes one or more ECUs 250g, 250h, or the like connected to a bus (communication path) 241, such as a CAN or a Local Interconnect Network (LIN), for example. Sensors, actuators, or the like are connected to the ECUs 250g and 250h connected to the body system NW 240, for example, and interior equipment, such as an air conditioner, a door, a lamp, or the like, is controlled by executing a predetermined program. In the following description, an arbitrary ECU, among ECUs 250a through ECU 250h, will be referred to as an "ECU 250".

The external communication device 260 includes a mobile communication device 261, a Vehicle-to-Everything (V2X) communication device 262, or the like connected to the gateway 200 via a network (communication path) 265, such as the Ethernet or the like, for example. The mobile communication device 261 is connected to the communication network 202 via a mobile communication network 201, such as the Long Term Evolution (LTE), 5th generation (5G), or the like, for example, and communicates with the log server 30, the SOC server 10, the SIRT server 40, or the like. The V2X communication device 262 performs a vehicle-to-vehicle communication, a road-to-vehicle communication, a pedestrian-to-vehicle communication, or the like, by Dedicated Short Range Communications (DSRC), cellular V2X communication, or the like, for example.

The OBD-2 connector 270 is a connector for connecting a diagnosis tester or the like that performs a fault diagnosis, to the in-vehicle network 100.

The gateway 200 is a trunk equipment that is connected to the information system NW 210, the drive system NW 220, the chassis system NW 230, the body system NW 240, the external communication device 260, and the OBD-2 connector 270, and performs data transfer between networks, protocol conversion, or the like.

The gateway 200, the mobile communication device 261, the V2X communication device 262, or the like can be implemented in the ECU 250, for example. Further, in the following description, constituent elements which communicate with via the in-vehicle network 100, such as the plurality of ECUs 250, the gateway 200, the mobile communication device 261, the V2X communication device 262, the OBD-2 connector 270, or the like, can be simply be referred to as "constituent elements".

(Log Data)

The constituent elements included in the in-vehicle network 100, such as the gateway 200, the external communication device 260, the ECU 250, or the like, have functions of continuously acquiring log data indicating an operation log thereof or the like, and transmitting the acquired log data to the log server 30 or the like.

A security sensor, such as a firewall, an Intrusion Detection System (IDS), an antivirus, a message filter, an error sensor, or the like, for example, is implemented in the gateway 200. When a predetermined event (for example, an error or the like) occurs at these security sensors, the gateway 200 generates log data including information on the event that occurred, and transmits the generated log data to the log server 30 or the like at a predetermined timing.

Similarly, a security sensor, such as the firewall, the IDS, the antivirus, the message filter, the error sensor, or the like, for example, is implemented in each of the external communication device 260 and the ECU 250. When a predetermined event (for example, an error or the like) occurs at these security sensors, the external communication device 260 and the ECU 250 generate log data including information on the event that occurred, and transmits the generated log data to the log server 30 or the like at a predetermined timing.

The mobile communication device 261 of the in-vehicle network 100 can store the generated log data in a storage or the like, and collectively transmit the log data stored in the storage or the like to the log server 30 or the like at a predetermined timing.

(Overview of Process)

For example, in order to take measures against the attack on the in-vehicle network 100, it is desirable to identify the constituent elements of the system which participated in or were involved in the attack including a plurality of stages for clarifying the events that may occur due to the attack. In particular, in the in-vehicle network 100 or the like including a plurality of networks and communication protocols as illustrated in FIG. 2, it is difficult to clarify the success factor of the attack or the events that may occur due to the attack, without identifying the constituent elements of the system which participated in or were involved in the attack.

Japanese Laid-Open Patent Publication No. 2020-119090 describes, among other things, estimating a device which is connected to the same bus as a device which generated the log data indicating an abnormal operation, as the area of influence affected by the abnormal operation, for example. However, according to this method, in a case where an error is detected in the information system NW 210 of FIG. 2, for example, the ECUs 250a, 250b, . . . , or the like connected to the bus 211 of the information system NW 210 are simply listed, and it is not possible to identify the constituent element which participated in or was involved in the attack.

Hence, when an attack is detected in the in-vehicle network 100 illustrated in FIG. 2, for example, the SOC server 10 according to the present embodiment has a function of listing attack vectors through which the attack is possible.

For example, the SOC server 10 prestores network configuration information related to a network configuration of the in-vehicle network 100 illustrated in FIG. 2 in a storage or the like. Alternatively, the SOC server 10 can acquire the network configuration information related to the in-vehicle network 100 from the vehicle 20, the external server 50, or the like.

In addition, in a case where an attack is detected in the in-vehicle network 100, the SOC server 10 outputs information of one or more attack vectors, including information of constituent elements related to the attack vectors, based on the log data of the in-vehicle network 100 and the network configuration information. Preferably, the SOC server 10 outputs the information of the attack vectors by a directed graph in which the constituent elements related to the attack are represented as nodes, and communication paths between the nodes related to the attack are represented as links. A method for outputting the information of the attack vectors will be described later in conjunction with specific embodiments.

Hence, in the information processing system 1 according to the present embodiment, when an attack is detected in the in-vehicle network 100 including a network and a plurality of constituent elements which performs communication via the network, it is easy to estimate the constituent elements which participated in or were involved in the attack.

The present embodiment can be applied to other information processing systems capable of identifying network configuration information, similar to the in-vehicle network 100.

<Hardware Configuration>

Figure 3:
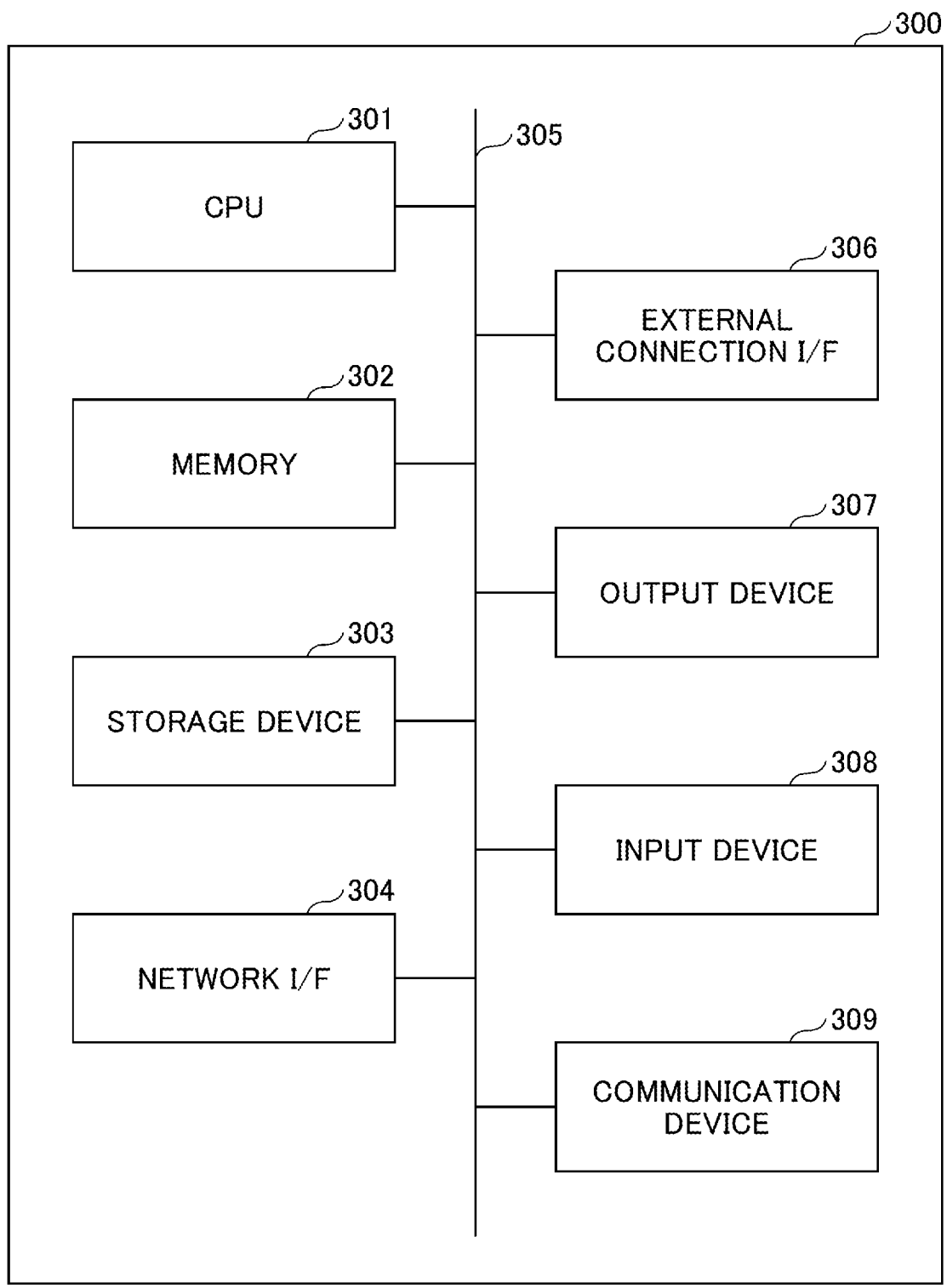
FIG. 3 is a diagram illustrating an example of a hardware configuration of a computer according to one embodiment.

The ECU 250, the gateway 200, the mobile communication device 261, the V2X communication device 262, or the like in FIG. 2 have a hardware configuration of a computer 300 illustrated in FIG. 3, for example. In addition, the SOC server 10, the SIRT server 40, the log server 30, the external server 50, or the like in FIG. 1 are configured by one or more computers 300, for example.

FIG. 3 is a diagram illustrating an example of a hardware configuration of the computer according to one embodiment. The computer 300 includes a Central Processing Unit (CPU) 301, a memory 302, a storage device 303, a network interface (I/F) 304, an internal bus 305, or the like, for example. The computer 300 can further include an external connection I/F 306, an output device 307, an input device 308, a communication device 309, or the like.

The CPU 301 is a processor configured to perform various functions by executing a program stored in a storage medium, such as the memory 302, the storage device 303, or the like. The storage medium may be a non-transitory computer-readable storage medium. The memory 302 includes a Random Access Memory (RAM) which is a volatile memory utilized by the CPU 301 as a temporary storage area, a Read Only Memory (ROM) which is a non-volatile memory configured to store a program or the like for booting the CPU 301, or the like. The storage device 303 is a large-capacity storage device, such as a Solid State Drive (SSD), a Hard Disk Drive (HDD), or the like, for example. The network I/F 304 includes one or more interfaces which connect the computer 300 to a network, such as the communication network 202, the in-vehicle network 100, or the like.

The external connection I/F 306 is an interface for connecting an external device to the computer 300. Various devices, such as a sensor, an actuator, an information terminal, an external memory, or the like, for example, can be connected to the external connection I/F 306. The output device 307 is an output device (for example, a display, a speaker, a lamp, or the like) configured to make an output to an outside. The input device 308 is an input device (for example, a keyboard, a mouse, a microphone, a switch, a button, a sensor, or the like) configured to receive an input from the outside. The input device 308 and the output device 307 can be an integrated input-output device (for example, a touchscreen panel display or the like). The communication device 309 is a communication device configured to perform various communication including, among others, mobile communication, such as LTE, 5G, or the like, wireless Local Area Network (LAN) communication, near field communication, such as Bluetooth or the like, for example. The internal bus 305 is connected in common to the constituent elements described above, and transmits an address signal, a data signal, various control signals, or the like, for example.

<Functional Configuration>
(Functional Configuration of SOC Server)

Figure 4:
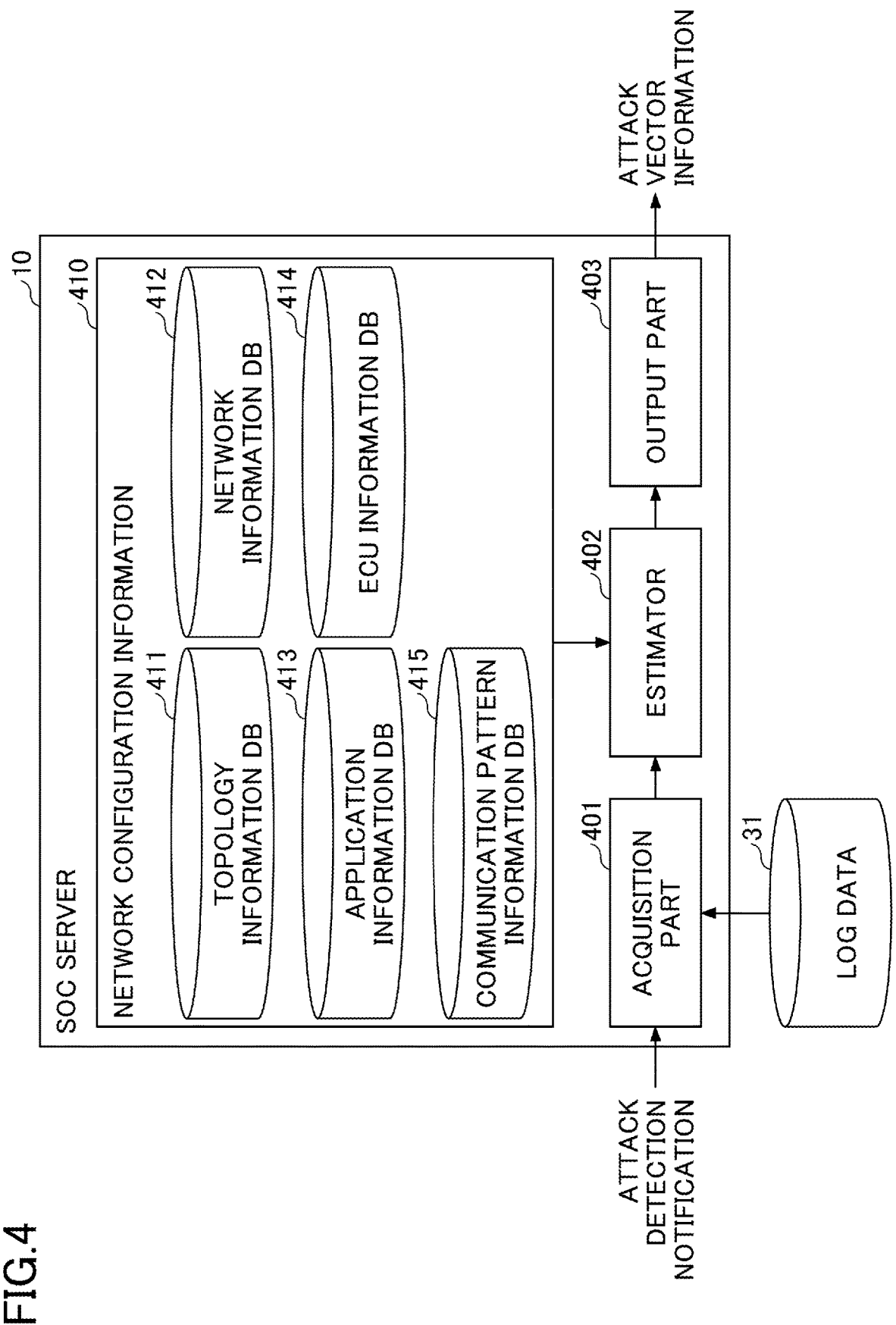
FIG. 4 is a diagram illustrating an example of a functional configuration of a SOC server according to one embodiment.

FIG. 4 is a diagram illustrating an example of a functional configuration of the SOC server according to one embodiment. The SOC server 10 implements an acquisition part 401, an estimator 402, an output part 403, or the like, by executing a predetermined program in one or more computers 300 included in the SOC server 10. At least a part of the functional configuration described above can be implemented by hardware.

In addition, as an example, the SOC server 10 stores network configuration information 410 in a storage, such as the storage device 303 or the like illustrated in FIG. 3. As another example, the network configuration information 410 can be stored in a storage server or the like outside the SOC server 10.

The acquisition part 401 performs an acquisition process that acquires the log data 31 transmitted from the in-vehicle network 100 of one or more vehicles 20, from the log server 30 or the like, for example. The in-vehicle network 100 is an example of a system including a network and a plurality of constituent elements which performs communication via the network.

In the case where an attack is detected in the in-vehicle network 100, the output part 403 performs an output process that outputs information of one or more attack vectors including information of constituent elements related to the attack vectors, based on the log data acquired by the acquisition part 401, and the network configuration information 410.

The estimator 402 performs an estimation process that estimates one or more attack vectors including the information of the constituent elements related to the attack vectors, by relating log data of a predetermined time period, among the log data 31 acquired by the acquisition part 401.

According to the configuration described above, the output part 403 outputs a report, including information of one or more attack vectors estimated by the estimator 402 based on the log data 31 and the network configuration information 410, for example, to the SIRT server 40 or the like.

The functional configuration of the SOC server 10 illustrated in FIG. 4 is an example. For example, the function of the estimator 402 can be included in the output part 403. In addition, the SOC server 10 can have the function of detecting the attack based on the log data 31, and can detect the attack on the in-vehicle network 100 without depending on an attack detection notification from the outside. Further, the estimator 402 can acquire only the network configuration information corresponding to the vehicle 20 in which the attack is detected, from the outside of the SOC server (for example, from the external server 50, the vehicle 20, or the like).

As a modification, the output part 403 can estimate and output information of one or more attack vectors, using an estimation model or the like obtained in advance by performing machine learning, by regarding the network configuration information and the log data of the attacked vehicle 20, as learning data, and the information of the attack vectors, as training data. In this case, because the SOC server 10 can acquire the information of one or more attack vectors, by inputting the network configuration information and the log data of the vehicle 20 in which the attack is detected to the learned estimation model, the SOC server 10 does not need to include the estimator 402.

(Functional Configuration of Estimator)

Figure 5:
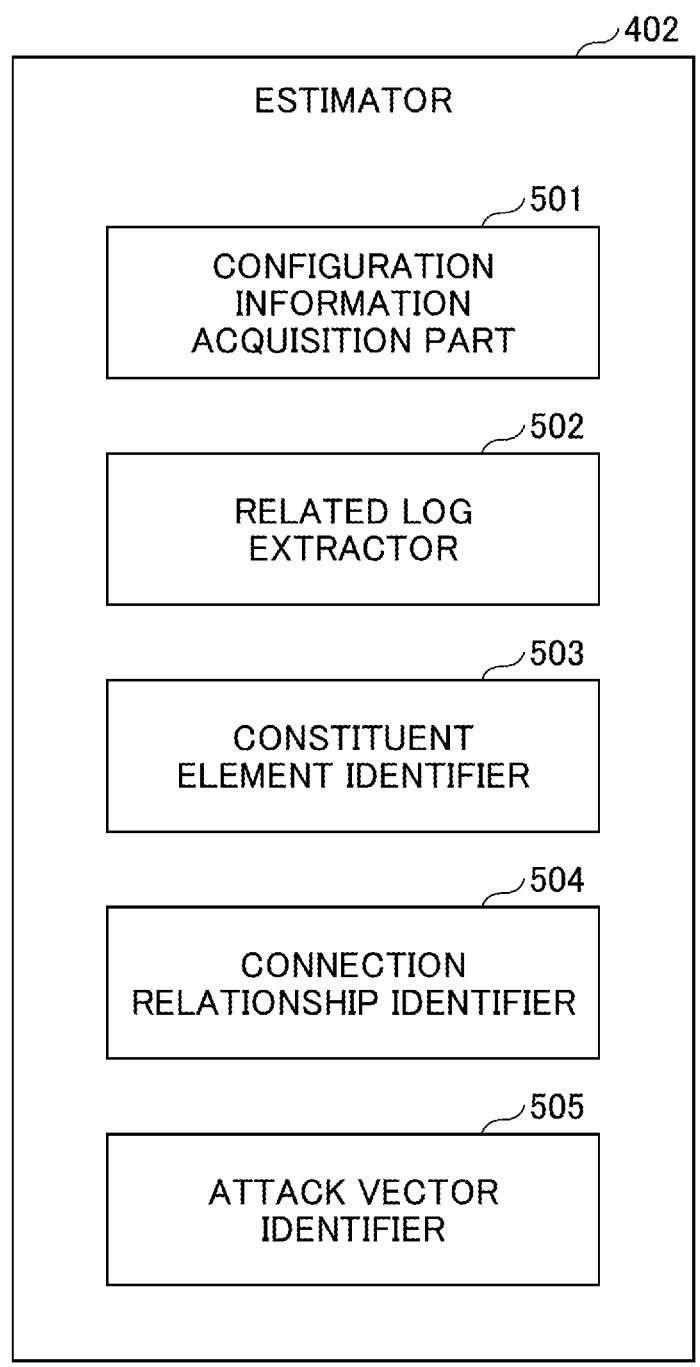
FIG. 5 is a diagram illustrating an example of a functional configuration of an estimator according to one embodiment.

FIG. 5 is a diagram illustrating an example of a functional configuration of the estimator according to one embodiment. The estimator 402 includes a configuration information acquisition part 501, a related log extractor 502, a constituent element identifier 503, a connection relationship identifier 504, an attack vector identifier 505, or the like, for example.

The configuration information acquisition part 501 acquires network configuration information corresponding to the vehicle 20 in which the attack is detected, from the network configuration information 410 prestored in the storage device 303 or the like included in the SOC server 10, for example. The configuration information acquisition part 501 can acquire the network configuration information corresponding to the vehicle 20 in which the attack is detected, from the external server 50, the vehicle 20, or the like, for example.

As illustrated in FIG. 4, the network configuration information 410 includes a topology information database (DB) 411, a network information DB 412, an application information DB 413, an ECU information DB 414, and a communication pattern DB 415, for example.

Figures 6A, 6B:
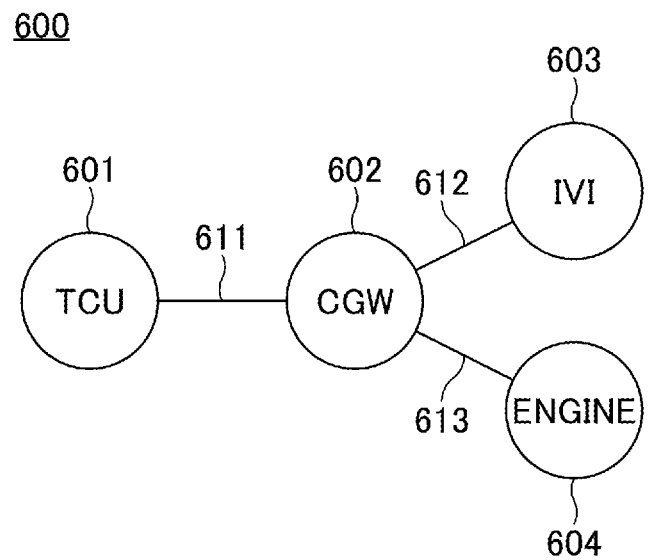
FIG. 6A is a diagram (1) illustrating an example of network configuration information according to one embodiment.
FIG. 6B is a diagram (2) illustrating the example of the network configuration information according to one embodiment.

FIG. 6A through FIG. 10B are diagrams illustrating examples of the network configuration information according to one embodiment. FIG. 6A illustrates an image of an example of the topology information DB 411 according to one embodiment. The topology information DB 411 stores topology information of the in-vehicle network 100 of a plurality of vehicles 20.

In the example of FIG. 6A, the topology information DB 411 includes, as items, information of an identification number, a node X, and a node Y. The vehicle identification number is identification information for identifying the vehicle 20. For example, a Vehicle Identification Number (VIN) or the like can be applied to the vehicle identification number. The node X indicates a constituent element (ECU or the like) at a connection source, and the node Y indicates a constituent element at a connection destination.

The topology information DB 411 illustrated in FIG. 6A indicates that, in the in-vehicle network 100 of the vehicle 20 having a vehicle identification number "JP000000000000001", the node X "TCU 601" is connected to the node Y "CGW 602" as illustrated in FIG. 6B. Similarly, it is indicated that the node X "CGW 602" is connected to two nodes Y "IVI 603" and "ENGINE 604".

The topology information DB 411 can be stored in a graph format in which the constituent elements, such as TCU 601, CGW 602, IVI 603, ENGINE 604, or the like, are represented as nodes, and connection relationships among the constituent elements are represented as links 611, 612, and 613, as illustrated in FIG. 6B.

FIG. 7A and FIG. 7B illustrate images of examples of the network information DB 412 according to one embodiment. The network information DB 412 stores information of communication paths connected to each of the ECUs (one example of the constituent elements) included in the in-vehicle network 100 of the plurality of vehicles 20.

In the example of FIG. 7A, a network information DB 412-1 includes, as items, information of the vehicle identification number, an ECU, an Ethernet (registered trademark) interface, an Ethernet segment, or the like. As described above, the vehicle identification number is the identification information for identifying the vehicle 20. The ECU is a name or identification information of a constituent element connected to the in-vehicle network 100. The Ethernet interface is a name or identification information of an Ethernet interface of each constituent element. The Ethernet segment is a name or identification information of an Ethernet segment (a minimum unit of a physical network in which communication is performed in the Ethernet interface) to which each constituent element is connected via the Ethernet interface.

The network information DB 412-1 illustrated in FIG. 7A indicates that an Ethernet interface "eth0" of an ECU "TCU" of the vehicle 20 having the vehicle identification number "JP000000000000001" is connected to an Ethernet segment "Ethernet-0", for example. Similarly, it is indicated, among other things, that an Ethernet interface "eth0" of an ECU "CGW" is connected to the Ethernet segment "Ethernet-0".

In the example of FIG. 7B, a network information DB 412-2 includes, as items, information of the vehicle identification number, the ECU, a CAN interface, a CAN bus, or the like. As described above, the vehicle identification number is the identification information for identifying the vehicle 20. The ECU is the name or identification information of the constituent element connected to the in-vehicle network 100. The CAN interface is a name or identification information of a CAN interface of each constituent element. The CAN bus is a name or identification information of a CAN bus to which each constituent element is connected via the CAN interface.

The network information DB 412-2 illustrated in FIG. 7B indicates, among other things, that a CAN interface "can0" of ECUs "CGW" and "IVI" of the vehicle 20 having the vehicle identification number "JP000000000000001" are connected to a CAN bus "CAN-0", for example. In addition, it is indicated, among other things, that a CAN interface "ca u1" of the ECU "CGW" is connected to a CAN bus "CAN-1", and a CAN interface "can0" of an ECU "ENGINE" is connected to a CAN bus "CAN-1". Accordingly, the network information DB 412 can be configured by a plurality of network information DBs 412-1 and 412-2.

FIG. 8A and FIG. 8B illustrate images of examples of the application information DB 413 according to one embodiment. The application information DB 413 stores information of communication paths corresponding to each of the applications (another example of the constituent elements) included in the in-vehicle network 100 of the plurality of vehicles 20, the identification information, or the like.

In the example of FIG. 8A, an application information DB 413-1 includes, as items, information of the vehicle identification number, the Ethernet segment, an application identifier, an application, or the like. As described above, the vehicle identification number is the identification information for identifying the vehicle 20. The Ethernet segment is information indicating the name, the identification information, or the like of the Ethernet segment to which an ECU executing the application is connected. The application identification information is identification information for identifying the application. The application is information indicating a name, a function, or the like of the application.

The application information DB 413-1 illustrated in FIG. 8A indicates, among other things, that an ECU that executes an application "traffic jam information notification" in the vehicle 20 having the vehicle identification number "JP000000000000001" is connected to the Ethernet segment "Ethernet-0", for example.

In the example of FIG. 8B, an application information DB 413-2 includes, as items, information of the vehicle identification number, the CAN bus, a CAN ID, and the application. As described above, the vehicle identification number is the identification information for identifying the vehicle 20. The CAN bus is information indicating a name, identification information, or the like of the CAN bus to which an ECU that executes the application is connected. The CAN ID is information indicating a CAN ID utilized by the application. The CAN ID is an identifier, included in data transmitted through the CAN bus, and indicating a data content, a destination node, or the like. The application is the information indicating the name, the function, or the like of the application.

The application information DB 413-2 illustrated in FIG. 8B indicates, among other things, that an ECU that executes an application "rotation speed notification" in the vehicle 20 having the vehicle identification number "JP000000000000001" is connected to the CAN bus "CAN-0", and uses a CAN ID "0x192". As described above, the application information DB 413 can be configured by a plurality of application information DBs 413-1 and DB 413-2.

FIG. 9A and FIG. 9B illustrate images of examples of the ECU information DB 414 according to one embodiment. The ECU information DB 414 stores communication addresses, identification information, or the like corresponding to each of the constituent elements included in the in-vehicle network of the plurality of vehicles 20.

In the example of FIG. 9A, an ECU information DB 414-1 includes, as items, information of the vehicle identification number, a MAC address, an ECU, or the like. As described above, the vehicle identification number is the identification information for identifying the vehicle 20. The Media Access Control (MAC) address is information indicating a MAC address assigned to the ECU. The ECU is information indicating the name, the identification information, or the like of an ECU (one example of the constituent element) connected to the in-vehicle network 100.

An ECU information DB 414-1 illustrated in FIG. 9A indicates, among other things, that the MAC address of an ECU "TCU" in the vehicle 20 having the vehicle identification number "JP000000000000001" is "02:00:00:00:01:01", for example.

In the example of FIG. 9B, an ECU information DB 414-2 includes, as items, information of the vehicle identification number, an IP address, the ECU, or the like. As described above, the vehicle identification number is the identification information for identifying the vehicle 20. The Internet Protocol (IP) address is information indicating an IP address assigned to the ECU. The ECU is the information indicating a name, identification information, or the like of the ECU (one example of a constituent element) connected to the in-vehicle network 100.

An ECU information DB 14-2 illustrated in FIG. 9B indicates, among other things, that the IP addresses of the ECU "CGW" in the vehicle 20 having the vehicle identification number "JP000000000000001" is "192.168.0.2", for example. Hence, the ECU information DB 414 can be configured by a plurality of ECU information DBs 414-1 and 414-2.

FIG. 10A and FIG. 10B illustrate images of examples of the communication pattern information DB 415 according to one embodiment. The communication pattern information DB 415 stores information of communication patterns among the constituent elements included in the in-vehicle network of the plurality of vehicles 20.

In the example of FIG. 10A, a communication pattern information DB 415-1 includes, as items, information of the vehicle identification number, the CAN bus, the CAN ID, a reception ECU, or the like. As described above, the vehicle identification number is the identification information for identifying the vehicle 20. The CAN bus is information indicating a name, identification information, or the like of a CAN bus to which the reception ECU is connected. The CAN ID is information indicating a CAN ID of CAN data received by the reception ECU. The reception ECU is information indicating a name, identification information, or the like of the ECU that receives the CAN data.

The communication pattern information DB 415-1 illustrated in FIG. 10A indicates, among other things, that the reception ECU "IVI" receives the data having a CAN ID "0x192" through the CAN bus "CAN-0" in the vehicle 20 having the vehicle identification number "JP000000000000001", for example.

In the example of FIG. 10B, the communication pattern information DB 415-2 includes, as items, information of the vehicle identification number, a source IP address, a destination IP address, an IP protocol, a source port number, a destination port number, or the like. As described above, the vehicle identification number is the identification information for identifying the vehicle 20. The source IP address is an IP address of a constituent element at a source. The destination IP address is an IP address of a constituent element at a destination. The IP protocol is information indicating the communication protocol, such as User Datagram Protocol (UDP), Transmission Control Protocol (TCP), or the like, for example. The source port number is information indicating a port number at the source. The destination port number is information indicating a port number at the destination.

A communication pattern information DB 415-2 illustrated in FIG. 10B indicates that there is a communication pattern transmitted with the source IP addresses "192.168.0.1" and the destination IP addresses "192.168.0.2", in the vehicle 20 having the vehicle identification number "JP000000000000001", for example. In addition, this communication pattern indicates, among other things, that a communication is performed using an IP protocol "UDP" and a destination port number "31000". As described above, the communication pattern information DB 415 can include a plurality of communication pattern information DBs 415-1 and DB 415-2.

The description of the functional configuration of the estimator 402 will be continued, by referring back to FIG. 5.

The configuration information acquisition part 501 acquires the network configuration information corresponding to the vehicle identification number of the vehicle 20 in which the attack is detected, among the network configuration information 410 described with reference to FIG. 6 through FIG. 10.

The related log extractor 502 extracts log data related to the detected attack, from the log data 31 acquired by the acquisition part 401. For example, the related log extractor 502 acquires the log data corresponding to the vehicle identification number of the vehicle 20 in which the attack is detected, from the log data 31 acquired by the acquisition part 401. The related log extractor 502 acquires the log data of a predetermined time period set in advance, from the log data corresponding to the vehicle identification number of the vehicle 20 in which the attack is detected.

Preferably, the related log extractor 502 relates the plurality of log data that are extracted, using the network configuration information acquired by the configuration information acquisition part 501. For example, the related log extractor 502 extracts the log data related to the detected attack, by directly or indirectly comparing items, defined in advance as being comparable, from among the plurality of log data that are extracted.

The constituent element identifier 503 performs a constituent element identification process that identifies a constituent element (ECU or the like) related to the detected attack, from the log data extracted by the related log extractor 502.

The connection relationship identifier 504 performs a connection identification process that identifies a connection relationship between the constituent elements identified by the constituent element identifier 503, using the topology information included in the network configuration information acquired by the configuration information acquisition part 501.

The attack vector identifier 505 uses the communication pattern information included in the network configuration information acquired by the configuration information acquisition part 501, a detection date and time of the log data, or the like, to perform an attack vector identification process that identifies a progressing direction of the attack in the connection relationship identified by the connection relationship identifier 504. The constituent element identification process performed by the constituent element identifier 503, the connection relationship identification process performed by the connection relationship identifier 504, and the attack vector identification process performed by the attack vector identifier 505 will be described later, by referring to specific embodiments.

(Example of Log Data)

FIG. 11 is a diagram illustrating an example of log data according to one embodiment. In the example of FIG. 11, the log data 31 includes, as items, information of a detection date and time, a vehicle identification information, a sensor name, an ECU name, an input interface name, an output interface name, a source MAC address, a destination MAC address, an application identifier, a CAN ID, and a detection event, or the like.

The detection date and time is information indicating a date and time when a predetermined detection event is detected. The vehicle identification number is information indicating a vehicle identification number of the vehicle 20 in which the detection event is detected. The sensor name is information indicating a name, a function, or the like of a security sensor that detected the detection event. The ECU name is information indicating a name, identification information, or the like of the ECU that detected the detection event.

The input interface name is information indicating a name, identification information, or the like of an interface to which data is input, in a case where the detection of the detection event is caused by an input of the data in the ECU. The output interface name is information indicating a name, identification information, or the like of an interface that output data in a case where the detection of the detection event is caused by an output of the data in the ECU. The source MAC address is information indicating a source MAC address included in the data in which a detection event is detected. The destination MAC address is information indicating a destination MAC address included in the data in which the detection event is detected.

The application identifier is information indicating an application identifier included in the data in which the detection event is detected. The CAN ID is information indicating a CAN ID included in the data in which the detection event is detected. The detection event is information indicating a name, identification information, or the like of the detected detection event.

The log data transmitted to the log server by the ECU that detected the detection event is stored in each record of the log data 31, when a predetermined detection event is detected in the in-vehicle network 100 of the vehicle 20, or the like, for example.

<Process Flow>

Next, a process flow of an information processing method according to the present embodiment will be described.

(Process of SOC Server)

FIG. 12 is a flow chart illustrating an example of a process of the SOC server according to one embodiment. An outline of the process performed by the SOC server 10 and the estimator 402 described in conjunction with FIG. 4 and FIG. 5, will be described. Details of the process will be described later with reference to FIG. 13 through FIG. 21.

In step S1201, when the SOC server 10 receives an attack detection notification indicating that an attack is detected from the log server 30, the vehicle 20, or the like, for example, the SOC server 10 performs the process of step S1202 and subsequent steps. The attack detection notification includes information, such as a Vehicle Identification Number (VIN) of the attacked vehicle 20, a detection time at which the attack is detected, or the like, for example.

In step S1202, the acquisition part 401 acquires the log data 31 as illustrated in FIG. 11 from the log server 30, for example.

In step S1203, the configuration information acquisition part 501 of the estimator 402 acquires the network configuration information corresponding to the vehicle identification number of the attacked vehicle 20, included in the attack detection notification, from each of the DBs 411 through 415 included in the network configuration information 410.

In step S1204, the related log extractor 502 of the estimator 402 performs a related log extraction process that extracts the log data related to the attack, from the log data 31 acquired by the acquisition part 401.

In step S1205, the constituent element identifier 503 of the estimator 402 uses the log data extracted by the related log extractor 502 and the network configuration information acquired by the configuration information acquisition part 501, to perform the constituent element identification process that identifies the constituent elements related to the attack.

In step S1206, the connection relationship identifier 504 of the estimator 402 uses the topology information included in the network configuration information acquired by the network configuration information acquired by the configuration information acquisition part 501, to perform the connection relationship identification process that identifies the connection relationship among the constituent elements identified by the constituent element identifier 503.

In step S1207, the attack vector identifier 505 of the estimator 402 performs the attack vector identification process that identifies the progressing direction of the attack, based on the communication pattern information included in the network configuration information acquired by the configuration information acquisition part 501, the detection date and time of the log data, or the like.

In step S1208, the output part 403 of the SOC server 10 outputs information of the one or more attack vectors estimated by the estimator 402. For example, the output part 403 outputs, to the SIRT server 40 or the like, a report listing one or more attack vectors represented by a directed graph of the progressing attack, wherein the constituent elements related to the detected attack are represented as nodes, and communication paths utilized by the progressing attack are represented as links.

(Related Log Extraction Process)

FIG. 13 is a flow chart illustrating an example of the related log extraction process according to one embodiment. This process is an example of a related log extraction process performed by the related log extractor 502 in step S1204 of FIG. 12.

In step S1301, the related log extractor 502 acquires the log data of the vehicle 20 in which the attack is detected, from the log data 31 acquired by the acquisition part 401. The log data 31 acquired by the acquisition part 401 includes a plurality of log data 1401 through 1406 having different vehicle identification numbers, as illustrated in FIG. 14A, for example. For example, in a case where the vehicle identification number included in the attack notification is "JP000000000000001", the related log extractor 502 selectively acquires the log data 1401, 1402, and 1404 through 1406 including the vehicle identification number "JP000000000000001", from among the plurality of log data 1401 through 1406.

In step S1302, the related log extractor 502 determines whether or not the log data of the vehicle 20 in which the attack is detected is acquired in step S1301, and the process proceeds to step S1303 when the log data is acquired. On the other hand, when the log data of the vehicle 20 in which the attack is detected is not acquired in step S1301, the related log extractor 502 ends the process of FIG. 13.

When the process proceeds to step S1303, the related log extractor 502 extracts the log data within a predetermined time period, from the log data acquired in step S1301. For example, as illustrated in FIG. 14B, the log data 1401, 1402, and 1404 through 1406 acquired in step S1301 include information on the detection date and time. The related log extractor 502 selectively acquires the log data 1401, 1402, 1404, and 1405 within the predetermined time period, from among the log data 1401, 1402, and 1404 through 1406, by excluding the log data (for example, the log data 1406) after the lapse of the predetermined time period. Accordingly, the related log extractor 502 can exclude old data having a low relation to the detected attack.

In step S1304, the related log extractor 502 determines whether or not the log data within the predetermined time period is acquired in step S1303, and the process proceeds to step S1305 when the log data within the predetermined time period is acquired. On the other hand, when the log data within the predetermined time period is not acquired in step S1303, the related log extractor 502 ends the process of FIG. 13.

In step S1305, the related log extractor 502 relates the log data extracted in step S1303, using the network configuration information acquired by the configuration information acquisition part 501. The related log extractor 502 performs the log data relating process illustrated in FIG. 15, for example.

Figure 15:
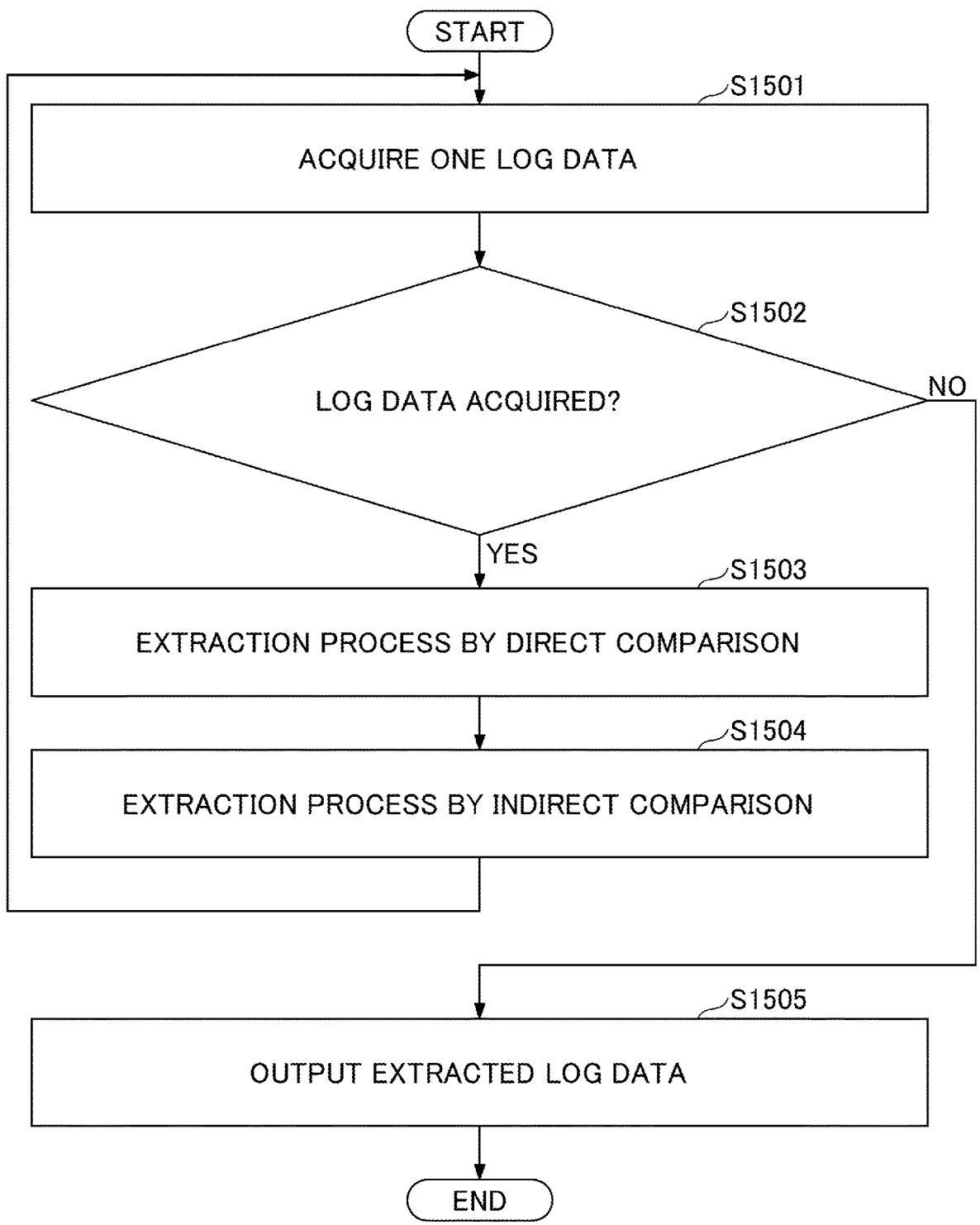
FIG. 15 is a flow chart illustrating an example of a log data relating process according to one embodiment.

FIG. 15 is a flow chart illustrating an example of the log data relating process according to one embodiment. This process is an example of a process performed by the related log extractor 502 in step S1305 of FIG. 13 with respect to the log data acquired and extracted in step S1303 of FIG. 13.

In step S1501, the related log extractor 502 acquires one log data from among the log data that are not yet acquired, among the log data extracted in step S1303.

In step S1502, the related log extractor 502 determines whether or not the log data is acquired, and the process proceeds to step S1503 when the log data is acquired. On the other hand, when the log data is not acquired, the related log extractor 502 causes the process to proceed to step S1505.

In step S1503, the related log extractor 502 directly compares the one log data that is acquired, with the other log data extracted in step S1303 of FIG. 13, and extracts the other log data related to the acquired one log data.

For example, the related log extractor 502 compares a value of an item predefined as "directly comparable" in the acquired one log data, with a value of an item having the same meaning as the predefined item in each of the other log data, and determines whether or not the compared values match. When the compared values match, the related log extractor 502 extracts the other log data including the matching value. As an example, among the items included in the log data 31 illustrated in FIG. 11, it is assumed that the source MAC address, the destination MAC address, the application identifier, the CAN ID, or the like are predefined as "directly comparable", for example.

In step S1504, the related log extractor 502 indirectly compares the acquired one log data, with the other log data not extracted in step S1503, and extracts the other log data related to the acquired one log data.

For example, the related log extractor 502 retrieves predefined network configuration information (for example, network information, application information, or the like), using the value of the item predefined as "indirectly comparable" in the acquired one log data, as a key. In addition, the related log extractor 502 compares the value obtained by the retrieval, with the value of the item included in the other log data not extracted in step S1503, and when the compared values match, extracts the other log data including the matching value.

Figure 16:
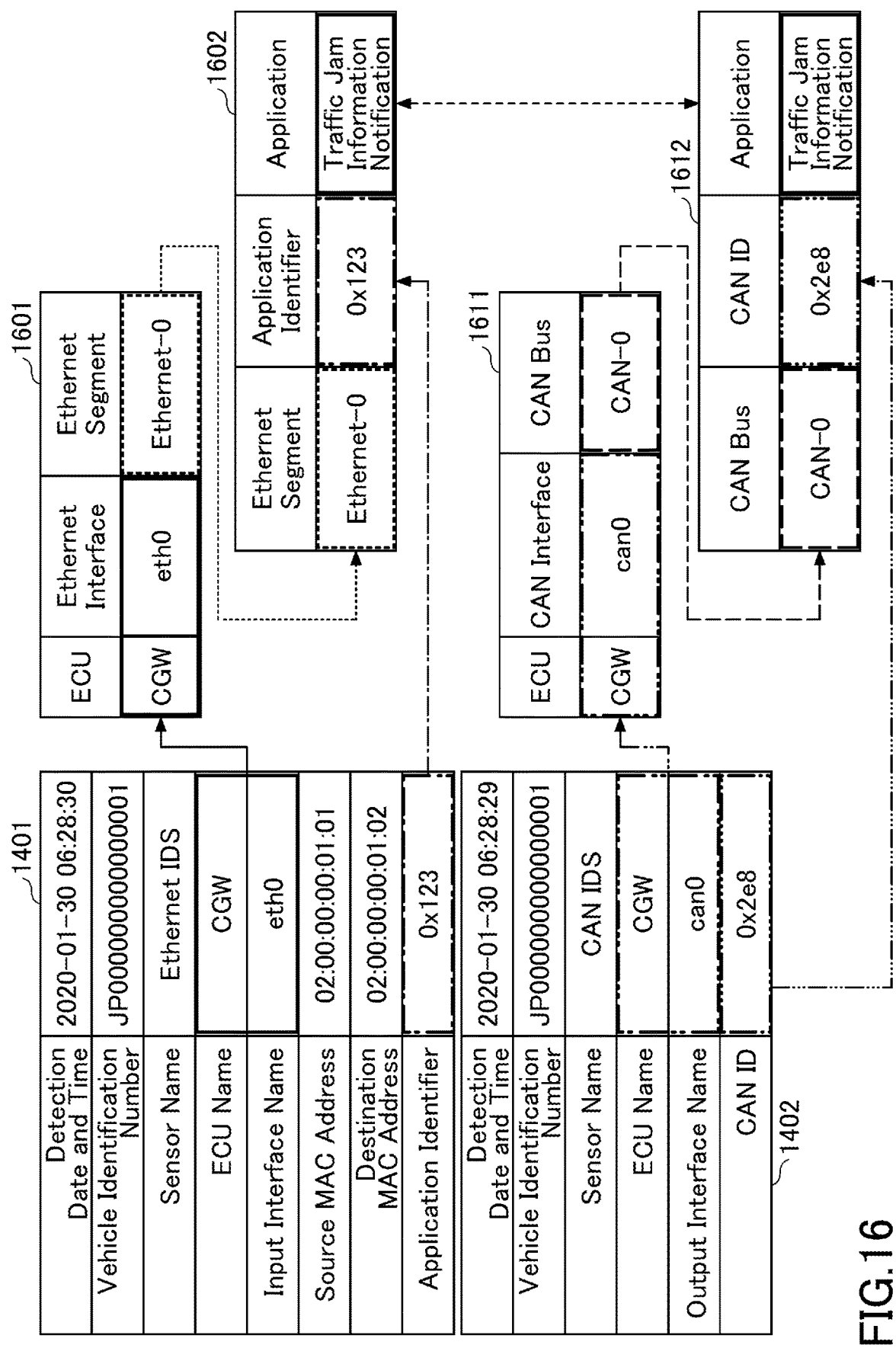
FIG. 16 is a diagram for explaining an extraction process by indirect comparison according to one embodiment.

FIG. 16 is a diagram for explaining an extraction process by the indirect comparison according to one embodiment. An example of a case will be described where there are no directly comparable items between the log data 1401 and the log data 1402 extracted in FIG. 14B, and the indirect comparison is performed. It is assumed that the configuration information acquisition part 501 already acquired a record corresponding to the vehicle identification number "JP000000000000001", as the network configuration information, from each of the DBs illustrated in FIG. 6 through FIG. 10.

The related log extractor 502 retrieves the network configuration information acquired by the configuration information acquisition part 501, using the ECU name "CGW" and the input interface name "eth0" in the log data 1401, for example, as the keys. Thus, network information 1601 illustrated in FIG. 16, for example, is retrieved. The network information 1601 indicates that the log data 1401 is log data related to the Ethernet segment "Ethernet-0".

Next, the related log extractor 502 retrieves the network configuration information acquired by the configuration information acquisition part 501, using the Ethernet segment "Ethernet-0" and the application identifier "0x123" in the log data 1401, for example, as the keys. Thus, application information 1602 illustrated in FIG. 16, for example, is retrieved. The related log extractor 502 can indirectly identify that the log data 1401 is log data related to the application "traffic jam information notification", based on the application information 1602.

Similarly, the related log extractor 502 retrieves the network configuration information acquired by the configuration information acquisition part 501, using the ECU name "CGW" and the output interface name can0" in the log data 1402, for example, as the keys. Thus, network information 1611 illustrated in FIG. 16, for example, is retrieved. The network information 1611 indicates that the log data 1402 is log data related to the CAN bus "CAN-0".

Next, the related log extractor 502 retrieves the network configuration information acquired by the configuration information acquisition part 501, using the CAN bus "CAN-0" and the CAN ID "0x2e8" in the log data 1402, for example, as the keys. Thus, application information 1612 illustrated in FIG. 16, for example, is retrieved. The related log extractor 502 can indirectly identify that the log data 1402 is also log data related to the application "traffic jam information notification", based on the application information 1612. In this case, the related log extractor 502 extracts the log data 1402, as log data related to the log data 1401.

The description of the flow chart will be continued, by referring back to FIG. 15.

When the process of step S1504 ends, the related log extractor 502 again performs the processes of steps S1501 and S1502, and when there is no more log data that is not yet acquired, the related log extractor 122 causes the process to proceed to step S1505.

When the process proceeds to step S1505, the related log extractor 502 outputs the log data extracted in steps S1503 and S1504, as log data related to the detected attack (hereinafter referred to as related log data), to the constituent element identifier 503 or the like.

(Constituent Element Identification Process)

Figure 17:
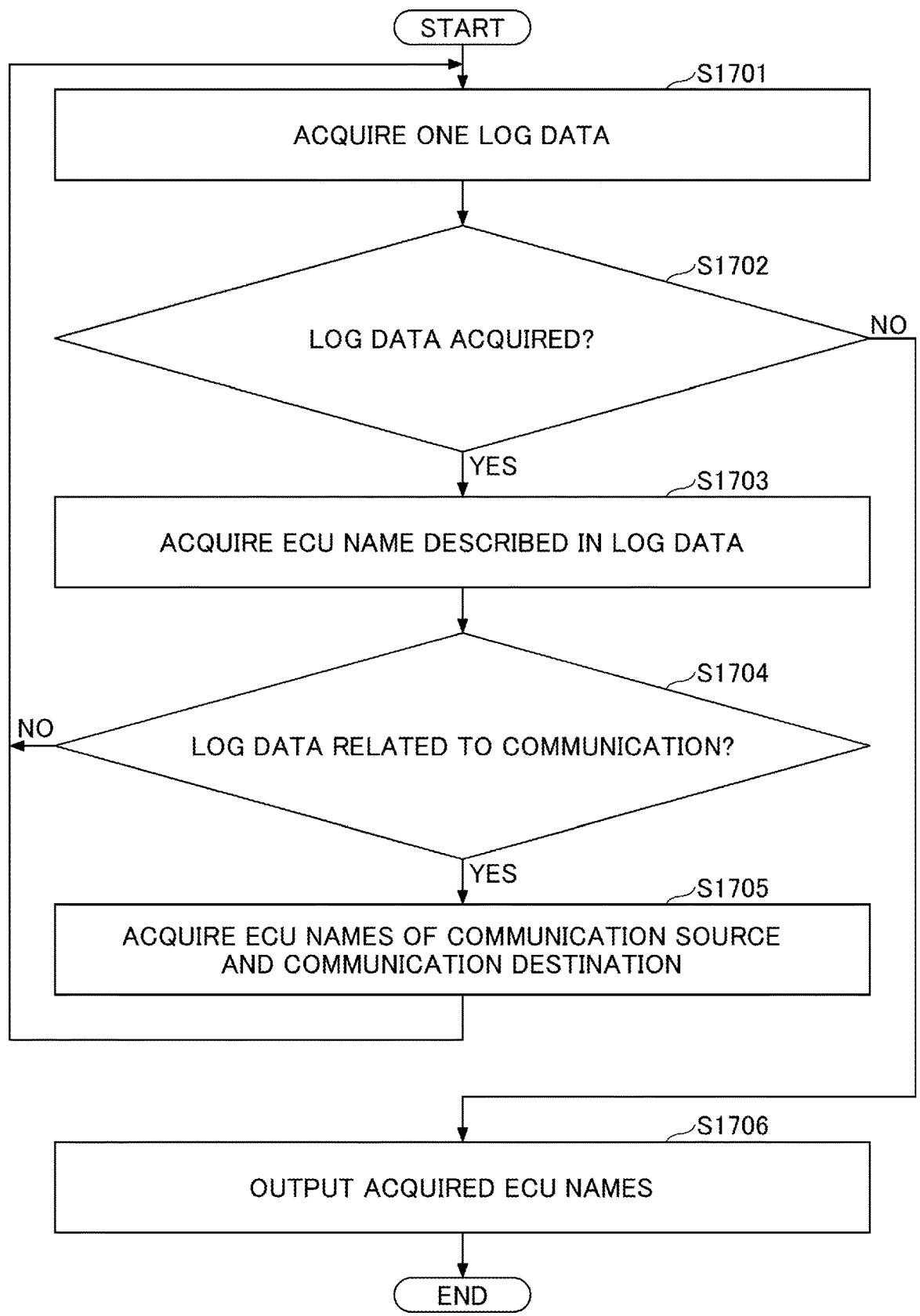
FIG. 17 is a flow chart illustrating an example of a constituent element identification process according to one embodiment.

FIG. 17 is a flow chart illustrating an example of the constituent element identification process according to one embodiment. This process is an example of the constituent element identification process performed by the constituent element identifier 503 in step S1205 of FIG. 12.

In step S1701, the constituent element identifier 503 acquires one log data from among the log data that are not yet acquired, among the related log data extracted by the related log extractor 502.

In step S1702, the constituent element identifier 503 determines whether or not the log data is acquired in step S1701, and when the log data is acquired, the process proceeds to step S1703. On the other hand, when the log data is not acquired in step S1701, the constituent element identifier 503 causes the process to proceed to step S1706.

When the process proceeds to step S1703, the constituent element identifier 503 acquires the ECU name described in the acquired log data.

In step S1704, the constituent element identifier 503 determines whether or not the acquired log data is a communication related log data. For example, the constituent element identifier 503 determines that log data including the item, such as the source address, the destination address, the CAN ID, or the like, among the items in the log data 31 illustrated in FIG. 11, is the communication related log data. In a case where the acquired log data is the communication related log data, the constituent element identifier 503 causes the process to proceed to step S1705. On the other hand, in a case where the acquired log data is not a communication related log data, the constituent element identifier 503 returns the process to step S1701.

When the process proceeds to step S1705, the constituent element identifier 503 acquires the ECU names of the communication source and the communication destination, from the communication related log data. For example, the constituent element identifier 503 retrieves the network configuration information acquired by the configuration information acquisition part 501, using the source address, the destination address, the CAN ID, or the like, among the items in the log data 31 illustrated in FIG. 11, as the keys, and acquires the ECU names related to the communication.

Figure 18:
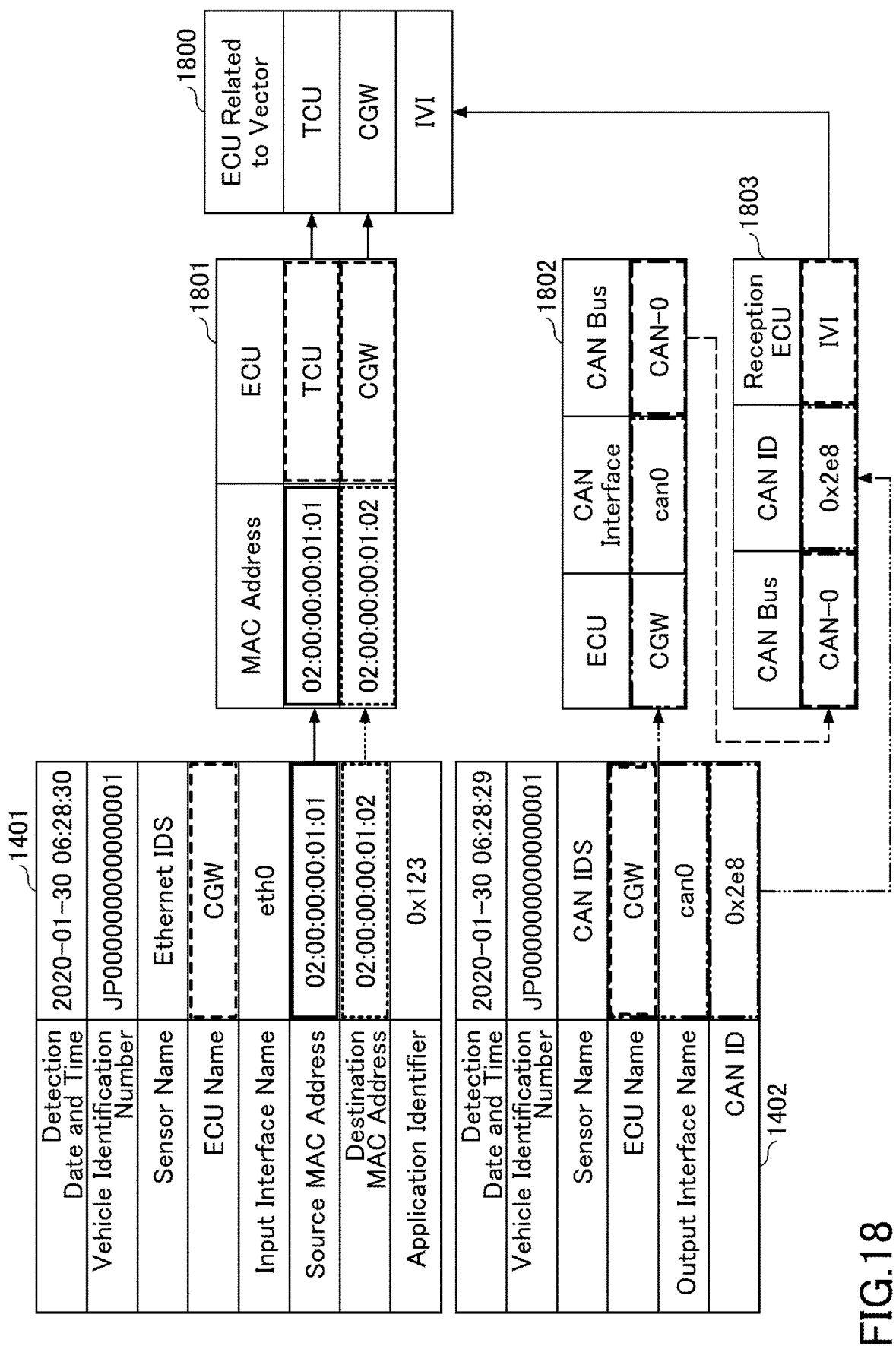
FIG. 18 is a diagram for explaining the constituent element identification process according to one embodiment.

FIG. 18 is a diagram for explaining the constituent element identification process according to one embodiment. An example of a case will be described where the constituent element identifier 503 acquires the ECU name of the communication source or the communication destination, from the communication related log data 1401 and 1402 illustrated in FIG. 18. It is assumed that the configuration information acquisition part 501 already acquired the record corresponding to the vehicle identification number "JP000000000000001", as the network configuration information, from each of the DBs illustrated in FIG. 6 through FIG. 10.

The constituent element identifier 503 retrieves the network configuration information acquired by the configuration information acquisition part 501, using the source MAC address "02:00:00:00:01:01" and the destination MAC address "02:00:00:00:01:02" in the log data 1401, for example, as the keys. Thus, ECU information 1801 illustrated in FIG. 18, for example, is retrieved. In this case, the constituent element identifier 503 acquires the ECUs "TCU" and "CGW" included in the ECU information 1801, as the ECUs related to the attack vectors.

Similarly, the constituent element identifier 503 retrieves the network configuration information acquired by the configuration information acquisition part 501, using the ECU name "CGW", the output interface name "can0", and the CAN ID "0x28" in the log data 1402, for example, as the keys. Hence, network information 1802 and communication pattern information 1803 illustrated in FIG. 18, for example, are retrieved. In this case, because the network information 1802 and the communication pattern information 1803 have a common item, namely, the CAN bus "CAN-0", the constituent element identifier 503 relates the two information, and acquires the reception ECU "IVI" as the ECU related to the attack vectors.

The description of the flow chart will be continued, by referring back to FIG. 17.

When the process of step S1705 ends, the constituent element identifier 503 again performs the processes of steps S1701 and S1702, and when there is no more log data that is not yet acquired, the constituent element identifier 503 causes the process to proceed to step S1706.

When the process proceeds to step S1708, the constituent element identifier 503 outputs the ECU names acquired in steps S1703 and S1705, to the connection relationship identifier 504 or the like, as the ECUs related to the attack.

(Connection Relationship Identification Process)

Figure 19:
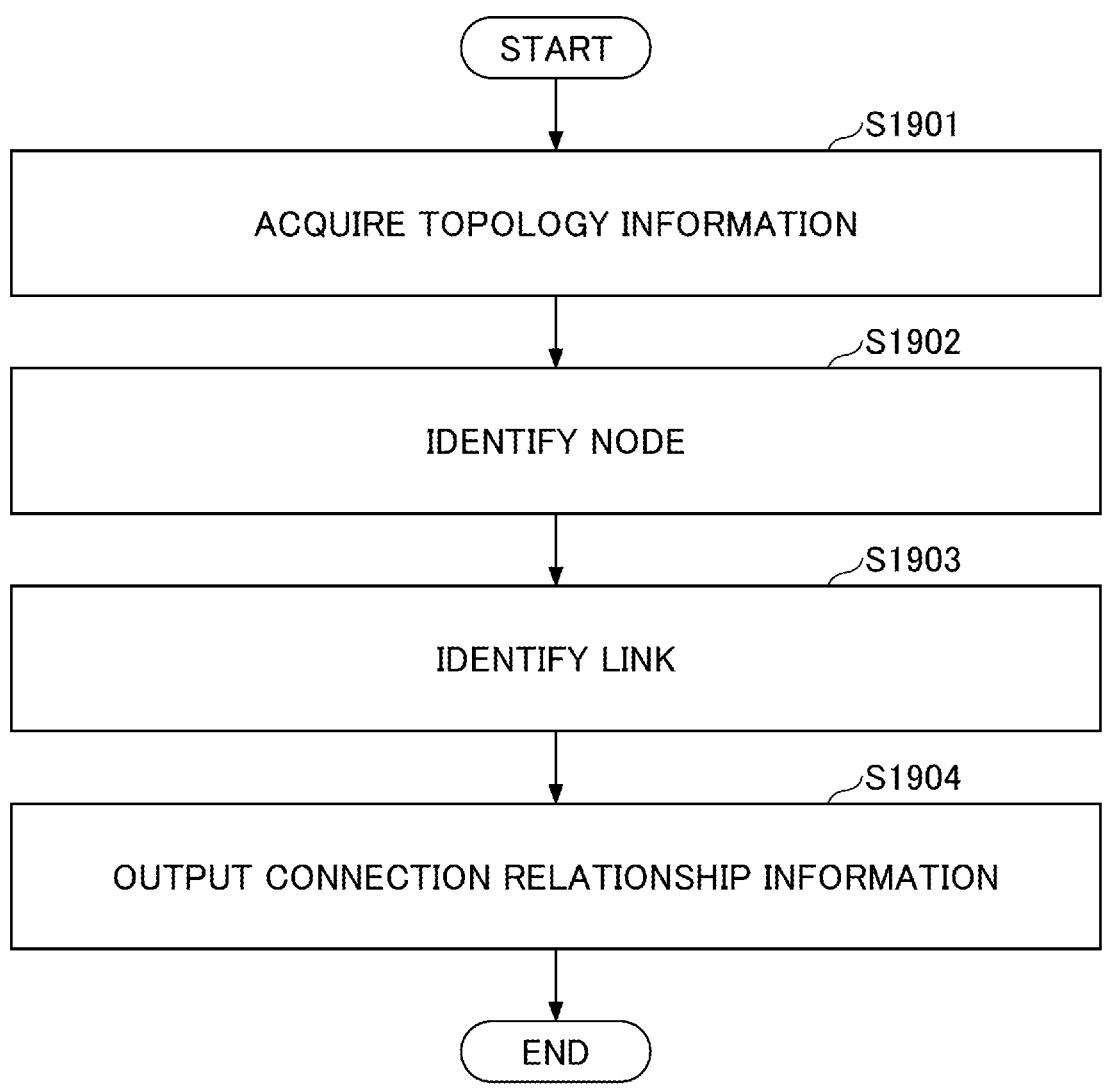
FIG. 19 is a flow chart illustrating an example of a connection relationship identification process according to one embodiment.

FIG. 19 is a flow chart illustrating an example of a connection relationship identification process according to one embodiment. This process is an example of the connection relationship identification process performed by the connection relationship identifier 504 in step S1206 of FIG. 12.

In step S1901, the connection relationship identifier 504 acquires the topology information of the in-vehicle network 100, from the network configuration information acquired by the configuration information acquisition part 501. For example, the connection relationship identifier 504 acquires topology information 600 having a graph format illustrated in FIG. 6B. Alternatively, the connection relationship identifier 504 can acquire topology information having a list format illustrated in FIG. 6A, and generate the topology information 600 having the graph format illustrated in FIG. 6B.

In step S1902, the connection relationship identifier 504 identifies a node corresponding to each of ECUs 1800 related to the vector identified by the constituent element identifier 503 in FIG. 18, for example, from among the nodes included in the acquired topology information 600.

Figure 20:
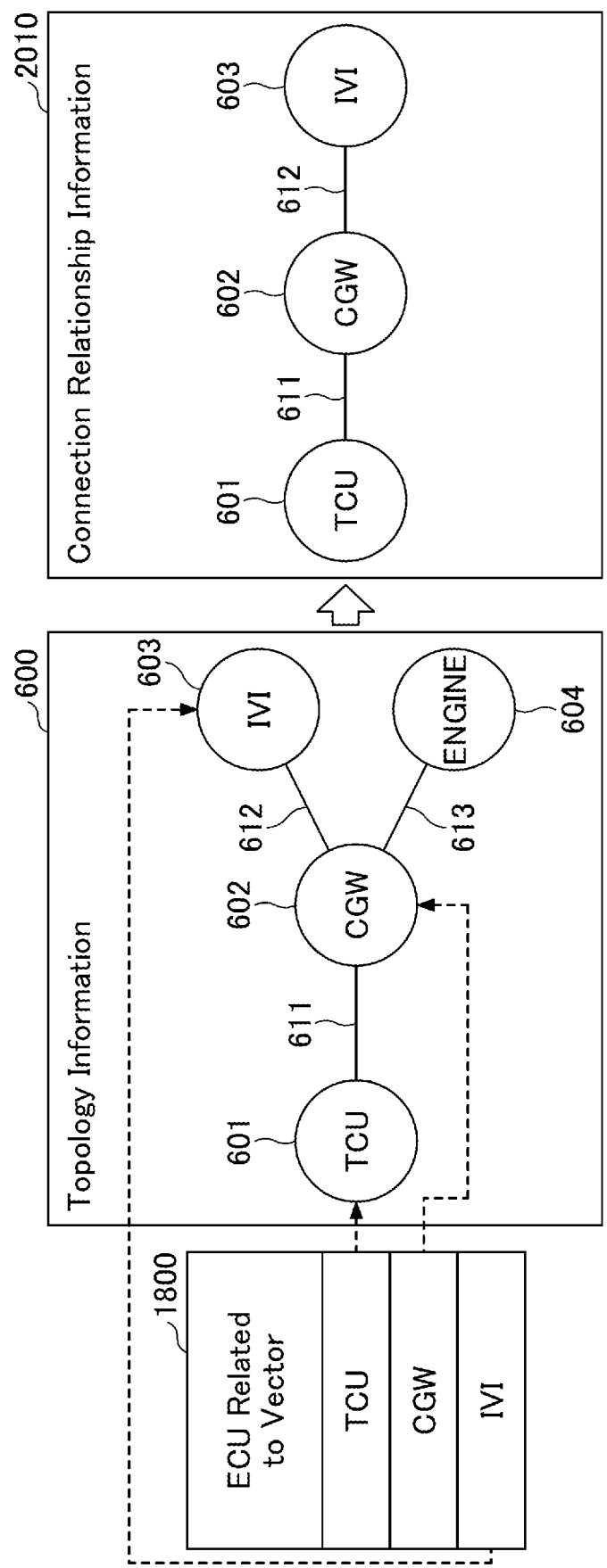
FIG. 20 is a diagram for explaining the connection relationship identification processing according to one embodiment.

FIG. 20 is a diagram for explaining the connection relationship identification process according to one embodiment. In the example illustrated in FIG. 20, the connection relationship identifier 504 identifies that the ECU "TCU" included in the ECU 1800 related to the vector, corresponds to the node "TCU 601" of the topology information 600, based on the ECU name "TCU". Similarly, the connection relationship identifier 504 identifies that the ECUs "CGW" and "IVI" included in the ECU 1800 related to the vector, correspond to the nodes "CGW 602" and "IVI 603" of the topology information 600, respectively.

In step S1903 of FIG. 19, the connection relationship identifier 504 identifies the link connecting the nodes identified in step S1902. In the example illustrated in FIG. 20, the connection relationship identifier 504 identifies the link 611 connecting nodes "TCU 601" and "CGW 602", and the link 612 connecting nodes "CGW 602" and "IVI 603". Thus, a node "ENGINE 604" and the link 613, which are not related to the attack vectors, are excluded from the topology information 600, and as illustrated in FIG. 20, connection relationship information 2010 indicating the nodes and the links related to the attack vectors, is obtained.

In step S1904, the connection relationship identifier 504 outputs the connection relationship information 2010 obtained by the processes of steps S1901 through S1903, to the attack vector identifier 505 or the like.

(Attack Vector Identification Process)

Figure 21:
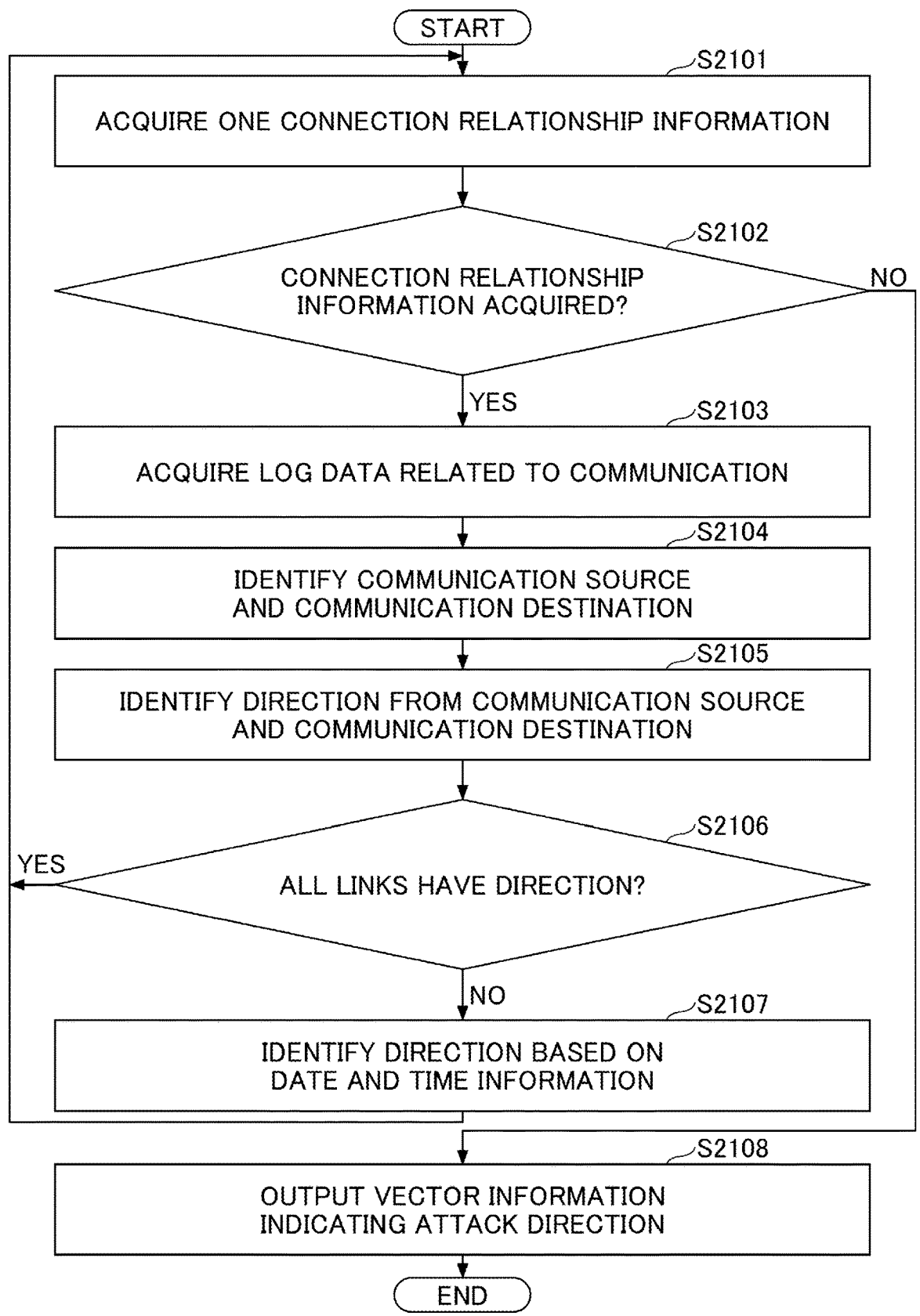
FIG. 21 is a flow chart illustrating an example of an attack vector identification process according to one embodiment.

FIG. 21 is a flow chart illustrating an example of the attack vector identification process according to one embodiment. This process is an example of the attack vector identification process performed by the attack vector identifier 505 in step S1207 of FIG. 12.

In step S2101, the attack vector identifier 505 acquires one connection relationship information, from among connection relationship information that are not yet acquired, among one or more connection relationship information output by the connection relationship identifier 504. The attack vector identifier 505 acquires connection relationship information 2010 illustrated in FIG. 20, for example.

In step S2102, the attack vector identifier 505 determines whether or not the connection relationship information is acquired in step S2101, and in a case where the connection relationship information is acquired, the attack vector identifier 101 causes the process to proceed to step S2103. On the other hand, in a case where the connection relationship information is not acquired in step S2101, the attack vector identifier 505 causes the process to proceed to step S2108.

When the process proceeds to step S2103, the attack vector identifier 505 acquires the communication related log data, from the related log data extracted by the related log extractor 502 in step S1204 of FIG. 12, for example. For example, the attack vector identifier 505 acquires the log data including the item, such as the source address, the destination address, the CAN ID, or the like, among the related log data, as log data of the communication relationship.

In step S2104, the attack vector identifier 505 retrieves the network configuration information acquired by the configuration information acquisition part 501, using the values of the items, such as the source address, the destination address, the CAN ID, or the like, for example, as the keys. Hence, the attack vector identifier 505 identifies a constituent element serving as the communication source or the communication destination in the connection relationship information 2010 acquired in step S2101.

Figure 22:
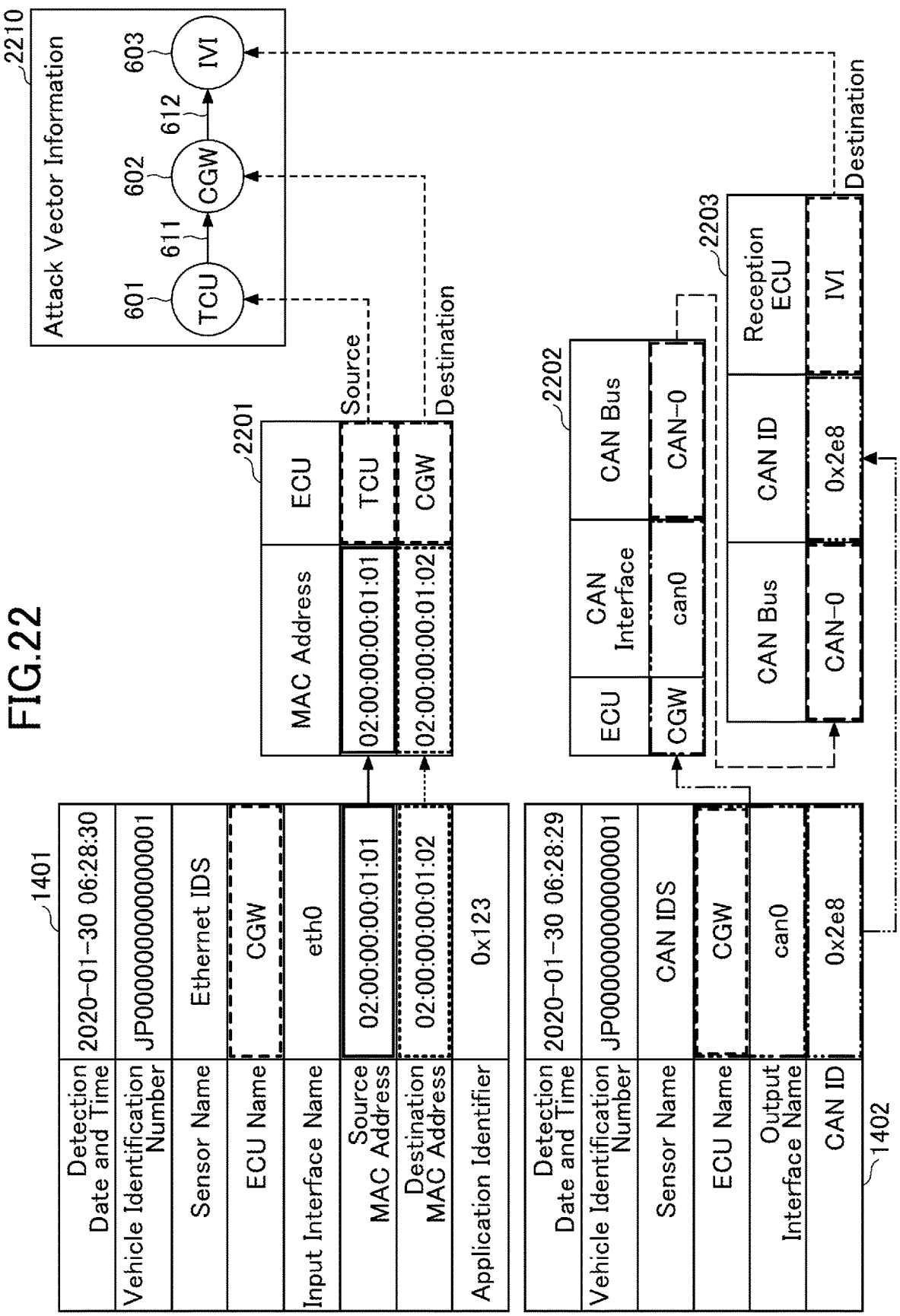
FIG. 22 is a diagram for explaining the attack vector identification process according to one embodiment.

FIG. 22 is a diagram for explaining the attack vector identification process according to one embodiment. In FIG. 22, the attack vector identifier 505 retrieves the network configuration information acquired by the configuration information acquisition part 501, using the source MAC address "02:00:00:00:01:01" and the destination MAC address "02:00:00:00:01:02" in the log data 1401, for example, as the keys. Accordingly, the attack vector identifier 505 can obtain ECU information 2201 illustrated in FIG. 22, for example, as a retrieval result. In this case, the attack vector identifier 505 can identify the node "TCU 601" corresponding to the source MAC address as the source, and the node "CGW 602" corresponding to the destination MAC address as the destination, from the retrieval result.

In addition, the attack vector identifier 505 retrieves the network configuration information acquired by the configuration information acquisition part 501, using the ECU name "CGW", the output interface name "can0", and the CAN ID "0x2e8" in the log data 1402, for example, as the keys. Accordingly, the attack vector identifier 505 can obtain network information 2202 and communication pattern information 2203 illustrated in FIG. 22, for example, as the retrieval result. In this case, the attack vector identifier 505 can identify the node "IVI 603" corresponding to the CAN ID "0x2e8" as the destination, from the retrieval result.

In step S2105 of FIG. 21, the attack vector identifier 505 identifies the direction of the link between the nodes, from the communication source and the communication destination identified in step S2104. For example, in FIG. 22, the attack vector identifier 505 updates the link 611 between the nodes "TCU 601" and "CGW 602" to a directed link directed from the source toward the destination. Similarly, the attack vector identifier 505 updates the link 612 between the nodes "CGW 602" and "IVI 603" to a directed link toward the destination. Hence, the attack vector identifier 505 can create attack vector information 2210 illustrated in FIG. 22, for example.

In step S2106, the attack vector identifier 505 determines whether or not all of the links of the attack vector information 2210 are directed links, and when not all of the links are directed links, causes the process to proceed to step S2107. On the other hand, when all the links of the attack vector information 2210 are directed links, the attack vector identifier 505 returns the process to step S2101.

In step 2102, the attack vector identifier 505 identifies the direction of the link whose direction is not identified, among the links included in the attack vector information 2210, based on the date and time information of the log data. For example, the attack vector identifier 505 arranges (sorts) the log data including information (for example, the ECU name, the CAN ID, or the like) capable of identifying the constituent element, among the related log data extracted by the related log extractor 502, in an ascending order (or a descending order) according to the detection date and time or the like. Moreover, the attack vector identifier 505 determines the direction of the link whose direction is not identified, among the links included in the attack vector information 2210, according to the sorted order. For example, the attack vector identifier 505 determines the direction of the link whose direction is not identified, using the log data having an earlier detection date and time as a start point, and the log data having a later detection date and time as an end point.

When the process of step S2107 ends, the attack vector identifier 505 again performs the processes of steps S2101 and S2102, and when there is no more connection relationship information that is not yet acquired, the attack vector identifier 101 causes the process to proceed to step S2108.

When the process proceeds to step S2108, the attack vector identifier 505 outputs one or more attack vector information created in the processes of steps S2103 through S2107, to the output part 403.

The output part 403 of the SOC server 10 outputs a report, including the one or more attack vector information output by the attack vector identifier 505, to the SIRT server 40 or the like, for example.

Through the processes described above, when the attack is detected in the in-vehicle network 100, the SOC server 10 outputs information of one or more attack vectors, including information of constituent elements related to the attack vectors, based on the log data and the network configuration information of the in-vehicle network 100. In addition, the SOC server 10 can output the information of the attack vectors by a directed graph in which the constituent elements related to the attack are represented as nodes, and communication paths among the nodes related to the attack are represented as links The system configuration of the information processing system 1 described with reference to FIG. 1, and the functional configuration of the SOC server 10 described with reference to FIG. 4 and FIG. 5, are merely examples, and various modifications and applications are possible. For example, at least a part of the functional constituent elements of the SOC server 10 can be included in the SIRT server 40, the vehicle 20, the log server 30, the external server 50, or the like. Further, the SOC server 10 can output a report including information of one or more attack vectors, not only to the SIRT server 40, but also to the vehicle 20, the external server 50, or the like, for example.

In addition, the information processing system and the information processing method according to the present embodiment are not limited to the application to the in-vehicle network 100 implemented in the vehicle 20, and can be applied to other communication networks capable of identifying network configuration information.

Further, the information of one or more attack vectors, including the information of the constituent elements related to the detected attack vector, which is output by the SOC server 10, is not limited to the attack vector information 2210 illustrated in FIG. 22, and can be the connection relationship information 2010 illustrated in FIG. 20, for example. The information of one or more attack vectors, including the information of the constituent elements related to the detected attack vector, which is output by the SOC server 10, can be information in a list format in which the information of the constituent elements related to the attack is arranged in time series, or the like.

As described above, according to the embodiments of the present invention, when an attack is detected in a system including a network and a plurality of constituent elements which communicate via the network, it is easy to estimate a constituent element that participated in or was involved in the attack.

According to one aspect of the embodiments of the present invention, it is possible to facilitate estimation of constituent elements which participated in or were involved in an attack, when the attack is detected in a system including a network and a plurality of constituent elements which performs communication via the network.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a storage that stores a program; and
a processor configured to execute the program and perform a process including:
  acquiring log data of a system including a network implemented in a vehicle and a plurality of constituent elements that communicate via the network,
  acquiring network configuration information, corresponding to the vehicle and including information on communication patterns of the constituent elements included in the network, in a case where an attack is detected in the vehicle;
  identifying constituent elements related to the detected attack, from the acquired log data;
  identifying a progressing direction of the detected attack, using the information on the communication patterns; and
  outputting information of one or more attack vectors indicating the progressing direction of the detected attack by a directed graph in which the constituent elements related to the detected attack are represented as nodes, and communication paths between the nodes related to the detected attack are represented as links, using the information on the communication patterns.

2. The information processing system as claimed in claim 1, wherein the network configuration information includes information on a topology of the network.

3. The information processing system as claimed in claim 2, wherein
  the estimating identifies a connection relationship of the constituent elements related to the one or more attack vectors, using the information on the topology of the network.

4. The information processing system as claimed in claim 1, wherein the network configuration information includes information on communication paths connected to each of the constituent elements included in the network.

5. The information processing system as claimed in claim 1, wherein the network configuration information includes information of communication addresses or identification information corresponding to the plurality of constituent elements connected to the network.

6. The information processing system as claimed in claim 1, wherein the information of the one or more attack vectors includes information on an electronic controller included in the one or more attack vectors.

7. The information processing system as claimed in claim 1, wherein the processor performs the process further including:
   extracting log data related to the detected attack, from the acquired log data,
   wherein the identifying the constituent elements identifies the constituent elements related to the detected attack, from the log data related to the detected attack.

8. An information processing method implemented in an information processing system that includes a processor configured to perform a process including:
   acquiring log data of a system including a network implemented in a vehicle and a plurality of constituent elements which communicate via the network;
   acquiring network configuration information, corresponding to the vehicle and including information on communication patterns of the constituent elements included in the network, in a case where an attack is detected in the vehicle;
   identifying constituent elements related to the detected attack, from the acquired log data;
   identifying a progressing direction of the detected attack, using the information on the communication patterns; and
   outputting information of one or more attack vectors indicating the progressing direction of the detected attack by a directed graph in which the constituent elements related to the detected attack are represented as nodes, and communication paths between the nodes related to the detected attack are represented as links, using the information on the communication patterns.

9. The information processing method as claimed in claim 8, wherein the processor is configured to perform the process further including:
   extracting log data related to the detected attack, from the acquired log data,
   wherein the identifying the constituent elements identifies the constituent elements related to the detected attack, from the log data related to the detected attack.

10. A non-transitory computer-readable storage medium having stored therein a program which, when executed by a computer, causes the computer to perform a process comprising:
    acquiring log data of a system including a network implemented in a vehicle and a plurality of constituent elements which communicate via the network;
    acquiring network configuration information, corresponding to the vehicle and including information on communication patterns of the constituent elements included in the network, in a case where an attack is detected in the vehicle;
    identifying constituent elements related to the detected attack, from the acquired log data;
    identifying a progressing direction of the detected attack, using the information on the communication patterns; and
    outputting information of one or more attack vectors indicating the progressing direction of the detected attack by a directed graph in which the constituent elements related to the detected attack are represented as nodes, and communication paths between the nodes related to the detected attack are represented as links, using the information on the communication patterns.

11. The non-transitory computer-readable storage medium as claimed in claim 10, wherein the program which, when executed by the computer, causes the computer to perform the process further comprising:
    extracting log data related to the detected attack, from the acquired log data,
    wherein the identifying the constituent elements identifies the constituent elements related to the detected attack, from the log data related to the detected attack.

* * * * *